United States Patent
Nakajima et al.

[19]

[11] Patent Number: 6,090,007
[45] Date of Patent: Jul. 18, 2000

[54] HYBRID VEHICLE DRIVE FORCE CONTROL DEVICE AND CONTROL METHOD

[75] Inventors: Yuki Nakajima, Yokohama; Shusaku Katakura; Masaaki Uchida, both of Yokosuka, all of Japan

[73] Assignee: Nissan Motor Co., Ltd., Yokohama, Japan

[21] Appl. No.: 09/271,337

[22] Filed: Mar. 18, 1999

[30] Foreign Application Priority Data

Mar. 20, 1998 [JP] Japan .................................. 10-072409
Mar. 10, 1999 [JP] Japan .................................. 11-063834

[51] Int. Cl.$^7$ .................................................. B60K 41/12
[52] U.S. Cl. .................................. 477/46; 477/3; 477/15
[58] Field of Search ........................... 477/2, 3, 15, 44, 477/46; 180/65.2, 65.3, 65.4, 65.5, 65.6

[56] References Cited

U.S. PATENT DOCUMENTS

| | | | |
|---|---|---|---|
| 5,789,881 | 8/1998 | Egami et al. ................. | 180/65.4 X |
| 5,846,155 | 12/1998 | Taniguchi et al. ............. | 477/2 |
| 5,873,426 | 2/1999 | Tabata et al. ................ | 477/2 X |
| 5,939,848 | 8/1999 | Yano et al. .................. | 180/65.4 X |
| 5,959,420 | 9/1999 | Boberg et al. ................ | 318/432 |

FOREIGN PATENT DOCUMENTS

| | | |
|---|---|---|
| 410448 | 1/1991 | European Pat. Off. ........... 701/62 |
| 0 781 680 A2 | 7/1997 | European Pat. Off. . |
| 0 788 914 A2 | 8/1997 | European Pat. Off. . |
| 62-110536 | 5/1987 | Japan . |
| 8-251708 | 9/1996 | Japan . |

*Primary Examiner*—Charles A Marmor
*Assistant Examiner*—Ha Ho
*Attorney, Agent, or Firm*—Foley & Lardner

[57] ABSTRACT

In a hybrid vehicle wherein the rotation torque of a motor and engine are input to a continuously variable transmission, a target speed ratio is determined from a target engine rotation speed set based on a target drive torque of said vehicle and a vehicle speed. A target combined torque of the motor and engine is set based on the target drive torque and a real speed ratio of the transmission. A target motor torque is determined based on the target combined torque and the input rotation speed of the continuously variable transmission. A value obtained by subtracting the target motor torque from the target combined torque is set equal to a target engine torque. The drive force of the hybrid vehicle is optimized by controlling the engine, motor and continuously variable transmission by the target engine torque, target motor torque and target speed ratio thus obtained.

12 Claims, 20 Drawing Sheets

HYBRID VEHICLE DRIVE FORCE CONTROL DEVICE AND CONTROL METHOD

FIELD OF THE INVENTION

This invention relates to a drive torque control of a so-called parallel hybrid vehicle which transmits the power of an engine and a motor/generator to drive wheels via a continuously variable transmission.

BACKGROUND OF THE INVENTION

Tokkai Hei 8-251708 published by the Japanese Patent Office in 1996 discloses a parallel hybrid drive system for a vehicle wherein an engine and motor/generator are connected to drive wheels via a V-belt continuously variable transmission.

A motor/generator is a device equipped with the functions of both a motor and a generator so that a rotor is rotated according to the energizing of the coil of a stator, and the coil of the stator generates a current according to the rotation input to the rotor.

Tokkai Sho 62-110536 published by the Japanese Patent Office in 1987 discloses a drive force controller for a vehicle equipped with an electronic throttle and a continuously variable transmission. A target vehicle drive torque is calculated based on the depression amount of an accelerator pedal and the vehicle speed, and a target rotation speed of the input shaft of the continuously variable transmission is calculated from the target vehicle drive torque and vehicle speed, and a target speed ratio of the continuously variable transmission is set to achieve the target rotation speed. Also, a target engine torque is calculated from the target speed ratio and target vehicle drive torque. The speed ratio of the continuously variable transmission is controlled to the target speed ratio, and the degree of opening of the electronic throttle is controlled to obtain the target engine torque. The torque required by a driver is thereby obtained.

SUMMARY OF THE INVENTION

In the above-mentioned hybrid drive system, the proportion of the output torque of the engine and motor/generator varies depending on the running state. For this reason, the above-mentioned drive force controller is not applicable to the hybrid drive system.

It is therefore an object of this invention to correctly control the drive force of a parallel hybrid vehicle which transmits the drive torque of the engine and motor/generator to the drive wheels via the continuously variable transmission.

In order to achieve the above object, this invention provides a control device for controlling drive force of a hybrid vehicle. The device controls, according to a depression of an accelerator pedal, an output torque of an engine, an output torque of a motor which varies according to a supply current from a battery, and a speed ratio of a continuously variable transmission which is connected to the engine and the motor.

The device comprises a sensor for detecting a depression amount of the accelerator pedal, a sensor for detecting a vehicle speed, a sensor for detecting an input rotation speed of the continuously variable transmission, a sensor for detecting an output rotation speed of the continuously variable transmission, an engine controller for varying the output torque of the engine based on a target engine torque, a motor controller for varying the output torque of the motor based on a target motor torque, a speed ratio controller for varying the speed ratio of the continuously variable transmission based on a target speed ratio, and a microprocessor.

The microprocessor is programmed to set a target drive torque of the vehicle based on the depression amount of the accelerator pedal and the vehicle speed, set a target engine rotation speed based on the target drive torque, set the target speed ratio based on the target engine rotation speed and the vehicle speed, calculate a real speed ratio of the continuously variable transmission from the input rotation speed and output rotation speed of the continuously variable transmission, set a target combined torque of the engine and the motor based on the target drive torque and the real speed ratio, set the target motor torque based on the target combined torque and the input rotation speed, and set the target engine torque based on the difference of the target combined torque and the target motor torque.

This invention also provides a control method for controlling drive force of a hybrid vehicle wherein an output torque of an engine, an output torque of a motor which varies according to a supply current from a battery, and a speed ratio of a continuously variable transmission which is connected to the engine and the motor are controlled according to a depression of an accelerator pedal.

The method comprises detecting a depression amount of the accelerator pedal, detecting a vehicle speed, detecting an input rotation speed of the continuously variable transmission, detecting an output rotation speed of the continuously variable transmission, setting a target drive torque of the vehicle based on the depression amount of the accelerator pedal and the vehicle speed, setting a target engine rotation speed based on the target drive torque, setting a target speed ratio based on the target engine rotation speed and the vehicle speed, calculating a real speed ratio of the continuously variable transmission from the input rotation speed and output rotation speed of the continuously variable transmission, setting a target combined torque of the engine and the motor based on the target drive torque and the real speed ratio, setting a target motor torque based on the target combined torque and the input rotation speed, setting a target engine torque based on the difference of the target combined torque and the target motor torque, varying an output torque of the engine based on the target engine torque, varying the output torque of the motor based on sad target motor torque, and varying a speed ratio of the continuously variable transmission based on the target speed ratio.

The details as well as other features and advantages of this invention are set forth in the remainder of the specification and are shown in the accompanying drawings.

DESCRIPTION OF THE PREFERRED EMBODIMENTS

Figure 1:
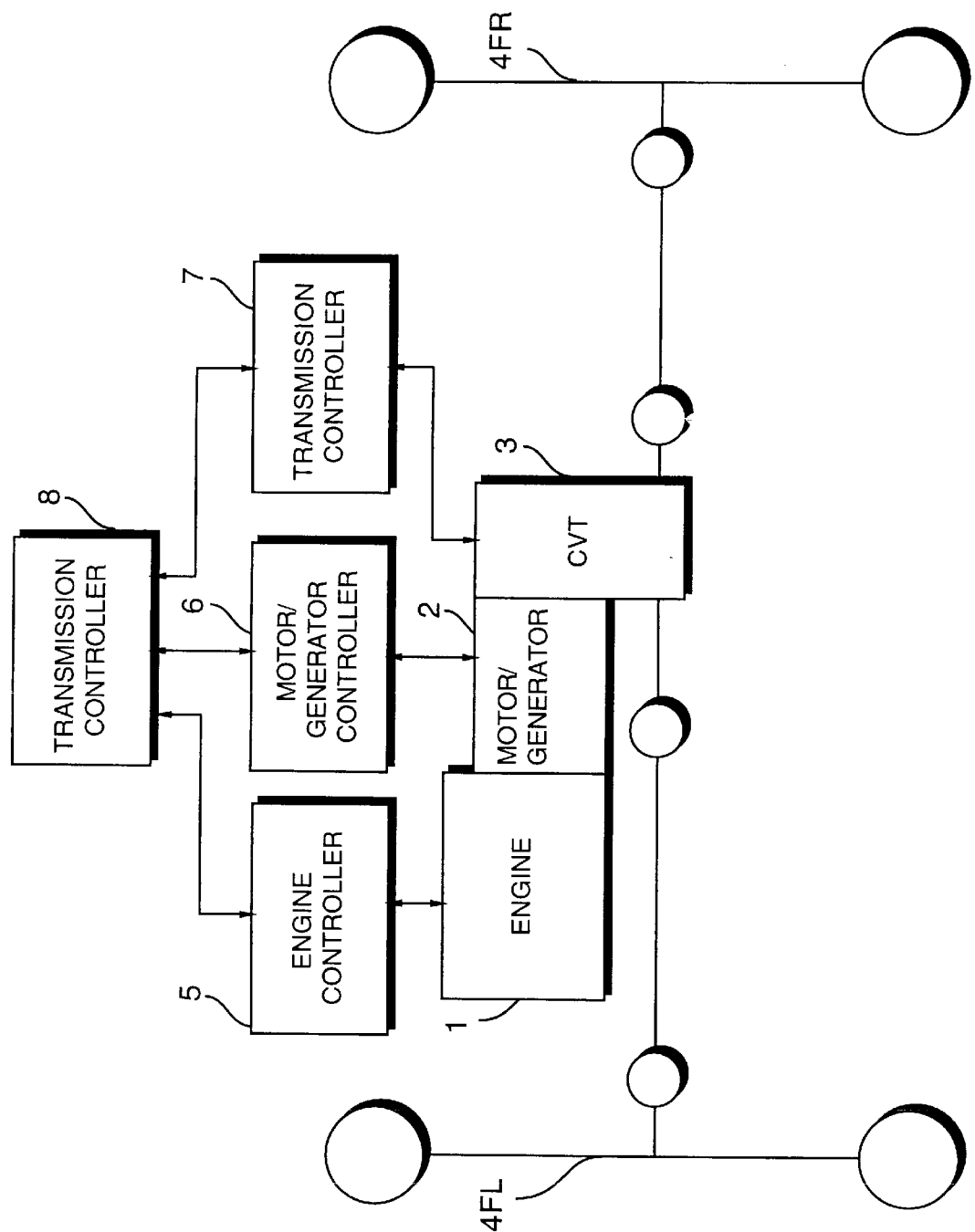
FIG. 1 is a schematic diagram of a drive force control device according to this invention.
Figure 2:
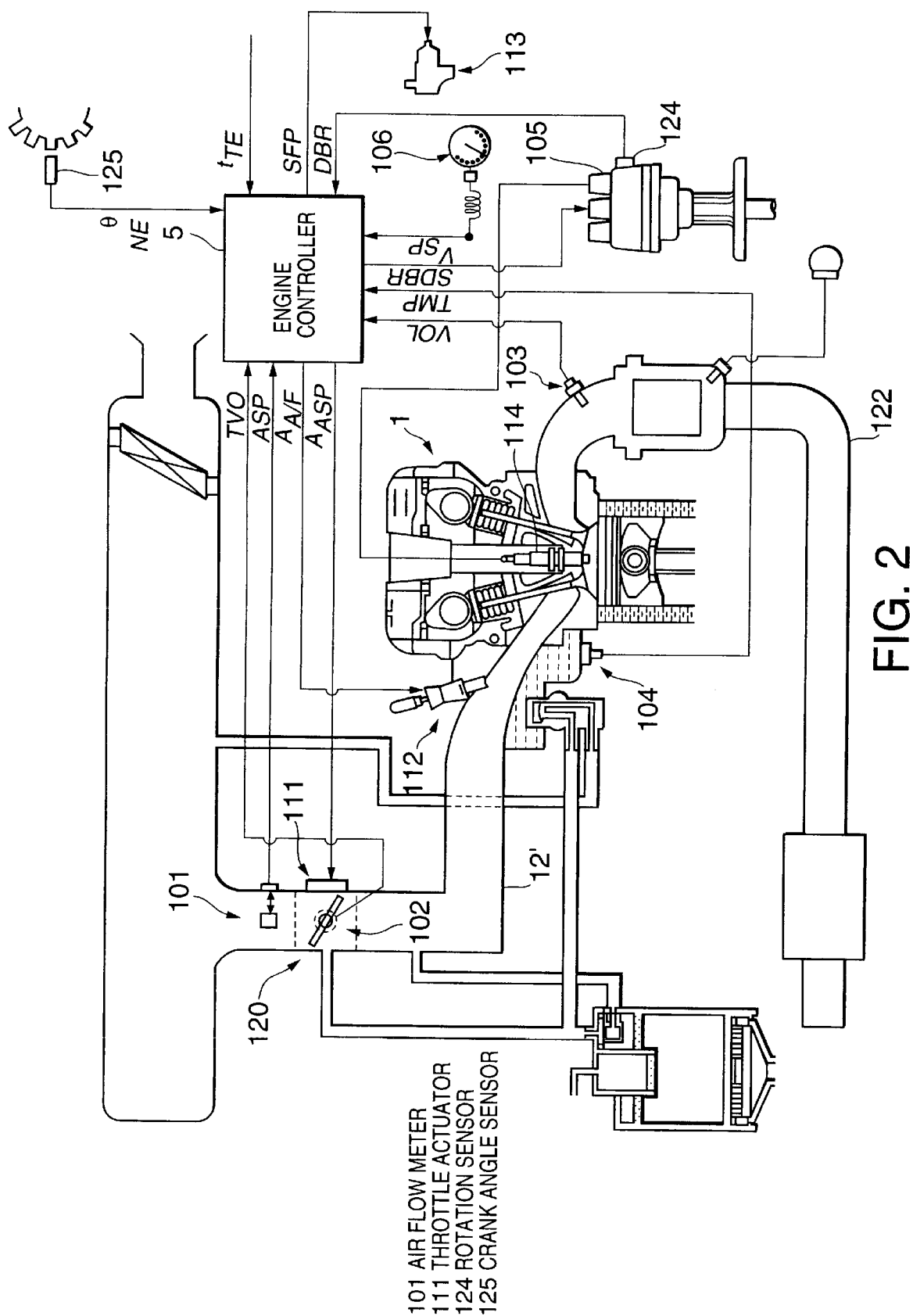
FIG. 2 is a schematic diagram of an engine controller according to this invention.
Figure 3:
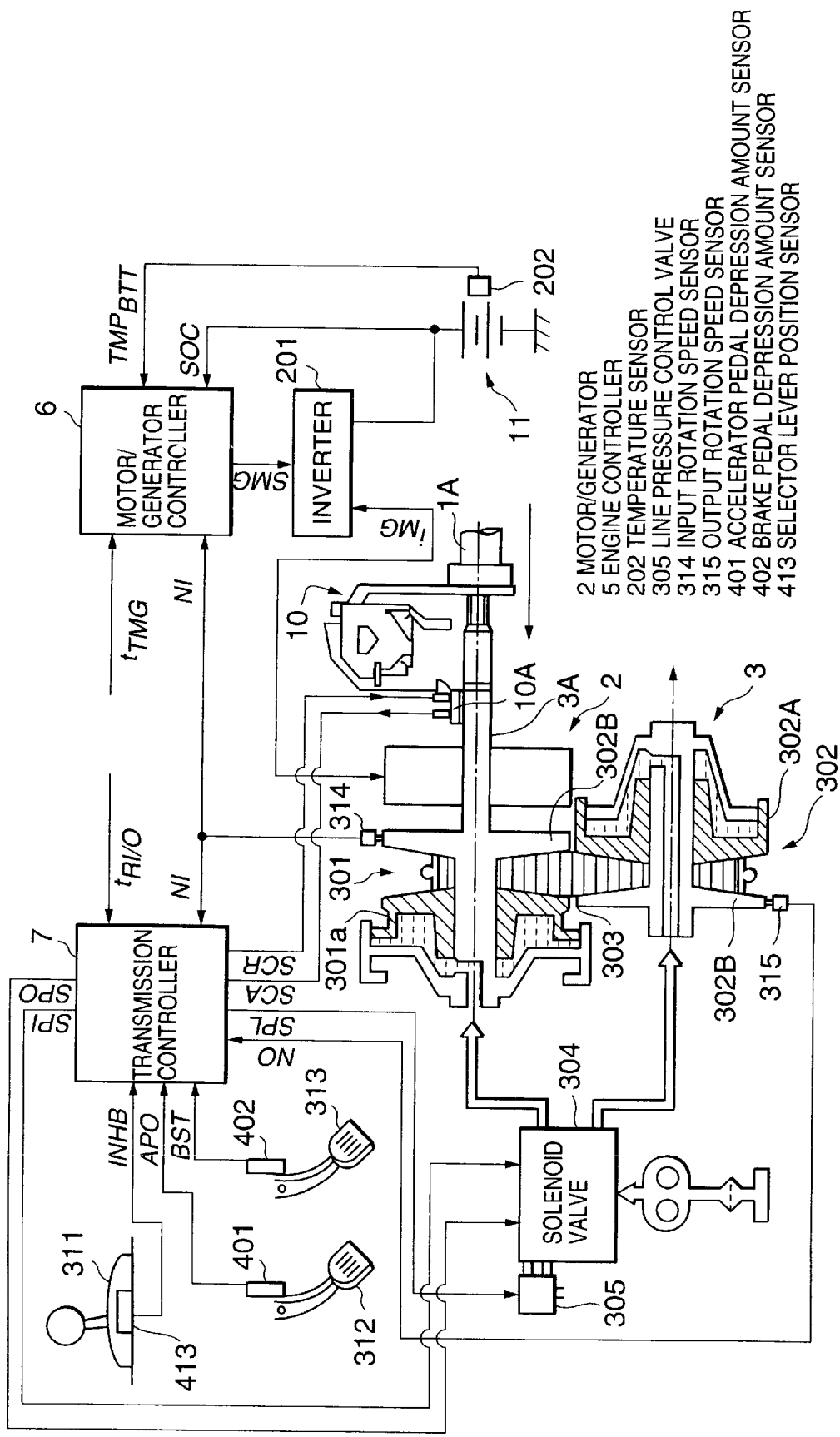
FIG. 3 is a schematic diagram of a motor/generator controller and a speed change controller according to this invention.

Referring to FIGS. 1–9 of the drawings, the output shaft of an engine 1 and the rotation shaft of a motor/generator 2 are connected in series to an input shaft of a continuously variable transmission (CVT) 3 via an electromagnetic powder clutch 10 shown in FIG. 3, and the final output shaft of the continuously variable transmission 3 is connected to front wheels 4FL, 4FR.

The engine 1 varies its output according to the output signal of an engine controller 5. The motor/generator 2 varies its output according to an output signal of a motor/generator controller 6.

The continuously variable transmission 3 varies its speed ratio according to an output signal of a transmission controller 7. Herein, a speed ratio is defined as input shaft rotation speed/output shaft rotation speed of the continuously variable transmission 3.

In order to give control target values to each of these controllers, respectively, the drive force control device of this invention is provided with a target value setting controller 8.

The target value setting controller 8 outputs a target engine torque $t_{TE}$ to the engine controller 5, outputs a target motor/generator torque $t_{TMG}$ to the motor/generator controller 6, and outputs a target speed ratio $t_{RI/O}$ to the transmission controller 7. The controllers 5 and 6 and 7 control each device according to the corresponding input target value.

Next, referring to FIG. 2, the engine 1 is a multi-cylinder water-cooled gasoline engine. The engine 1 is provided with an intake pipe 121 which aspirates air, exhaust pipe 122 which discharges exhaust gas, electronic throttle 120 provided in the intake pipe 121, fuel injector 112 which injects a fuel into the intake air, fuel feed pump 113 which supplies fuel to the fuel injector 112, spark plug 114 which ignites an air-fuel mixture, and a distributor 123 which supplies a firing current to the spark plug 114. The electronic throttle 120 varies a degree of its opening by a throttle actuator 111 which responds to a signal from the engine controller 5. This degree of opening, i.e. the throttle opening, basically corresponds to a depression amount of the accelerator pedal 312 shown in FIG. 3, but the engine controller 5 increases or decreases the throttle opening independently of the depression amount of the accelerator pedal 312 according to demand.

Signals are input to the engine controller 5 from an air flow meter 101 which detects an intake air flowrate ASP of the intake pipe 121, throttle sensor 102 which detects a throttle opening TVO of the electronic throttle 102, oxygen sensor 103 which detects an oxygen concentration VOL, water temperature sensor 104 which detects a cooling water temperature TMP of the engine 1, rotation sensor 124 which detects a rotation speed of the distributor 105, vehicle speed sensor 106 which detects a vehicle speed VSP, and a crank angle sensor 125 which detects an engine rotation angle θ and rotation speed NE of the engine 1. A target engine torque is also input as a signal from the above-mentioned target value setting controller 8.

The engine controller 5 calculates a fuel injection amount based on the intake air flowrate ASP, cooling water temperature TMP, engine rotation speed NE, and engine rotation angle θ. Moreover, an ignition timing of the spark plug 114 is calculated based on the engine load represented by the throttle opening TVO and the engine rotation speed NE.

An air-fuel ratio signal $A_{A/F}$ is output to the fuel injector 112, a corresponding pump control signal SFP is output to the fuel pump 113, and an ignition timing signal SDBR is output to the distributor 105 so that the calculated fuel injection amount and ignition are attained. Moreover, an intake air flowrate signal $A_{ASP}$ is output to the throttle actuator 111 so that the target engine torque input from the target value setting controller 8 is achieved.

If a diesel engine is used instead of the gasoline engine 1, the torque may be controlled by controlling the fuel injection amount, for the reason that the output torque of the diesel engine is proportional to the fuel injection amount.

Next, referring to FIG. 3, the continuously variable transmission 3 is a V-belt continuously variable transmission wherein a belt 303 is wound on a drive pulley 301 and a driven pulley 302.

The drive pulley 301 is provided with a movable wheel 301A and fixed wheel 301 B. The driven pulley 302 is provided with a movable wheel 302A and fixed wheel 302B.

When the movable wheels 301A and 302A are displaced in an axial direction, the contact radii of the belt 303 and pulleys 301, 302 vary, and the speed ratio varies as a result. These are supported by an oil pressure supplied via a solenoid valve 304. Line pressure is supplied to the solenoid valve 304 from an oil pump, not shown, via a line pressure control valve 305. The solenoid valve 304 adjusts this line pressure, and supplies it to the movable wheels 301A and 302A.

An input shaft 3A of continuously variable transmission 3 is connected to the drive pulley 301. The other end of the input shaft 3A is connected to an output shaft 1A of the engine 1 via the electromagnetic powder clutch 10. One of the roles of the electromagnetic powder clutch 10 is to intercept the engine 1 and the continuously variable transmission 3 to enable the stopping of the engine 1 when the torque of the engine 1 is not required. The electromagnetic powder clutch 10 is connected to the transmission controller 7 via a slip ring 10A, and its tightening force is varied according to an engaging force signal SCA from the transmission controller 7. At the same time, the present engaging force is output to the transmission controller 7 as an engaging force signal SCR.

Signals to the transmission controller 7 are input from a selector lever position sensor 413 which detects a selection range INHB of a selector lever 311, an accelerator pedal depression amount sensor 401 which detects an operating amount APO of an accelerator pedal 312, a brake pedal depression amount sensor 402 which detects a depression amount BST of a brake pedal 313, an input rotation speed sensor 314 which detects an input rotation speed NI of the continuously variable transmission 3, and an output rotation speed sensor 315 which detects an output rotation speed NO of the continuously variable transmission 3.

The input rotation speed of the continuously variable transmission 3 is equivalent to the rotation speed of the drive pulley 301, and the outnut rotation speed of the continuously variable transmission 3 is equivalent to the rotation speed of the driven pulley 302.

The transmission controller 7 calculates a real speed ratio $R_{I/O}$ which is the ratio of the input shaft rotation speed NO and the power output rotation speed NI from these input signals, and determines the fluid pressure supplied to the movable wheels 301A, 302A so that the real speed ratio coincides with the target speed ratio $t_{RI/O}$ input from the target value setting controller 8. Corresponding signals SPI, SPO are output to a solenoid valve 304. Further, a line pressure signal SPL is output to the line pressure control valve 305, and the clutch engaging force signal SCA is output to the electromagnetic powder clutch 10.

It is also possible to use a torque converter instead of the electromagnetic powder clutch 10. The control of the transmission controller 7 in this case will be described later.

Moreover, the output rotation speed NO of the output rotation speed sensor 315 may also be used as the above-mentioned vehicle speed VSP by multiplying it by a predetermined coefficient.

The motor/generator 2 is directly linked with the input shaft 3A of the continuously variable transmission 3. The motor/generator 2 has the function of a motor and a generator and is connected to a battery 11 via an inverter 201.

The input rotation speed NI is input to the motor/generator controller 6. A target motor/generator torque $t_{TMG}$ is also input from the target value setting controller 8.

The motor/generator controller 6 outputs a motor/generator control signal SMG to the inverter 201 based on these input signals. The inverter 201 varies the direction and magnitude of the current $i_{MG}$ supplied to the motor/generator 2 according to this control signal SMG. When the motor/generator 2 is used for regeneration, the current $i_{MG}$ flows from the motor/generator 2 to a battery 11 via the inverter 201.

The signals input to the engine controller 5, motor/generator controller 6 and transmission controller 7, and the signals output by these controllers, are also input to the target value setting controller 8 as required.

Figure 4:
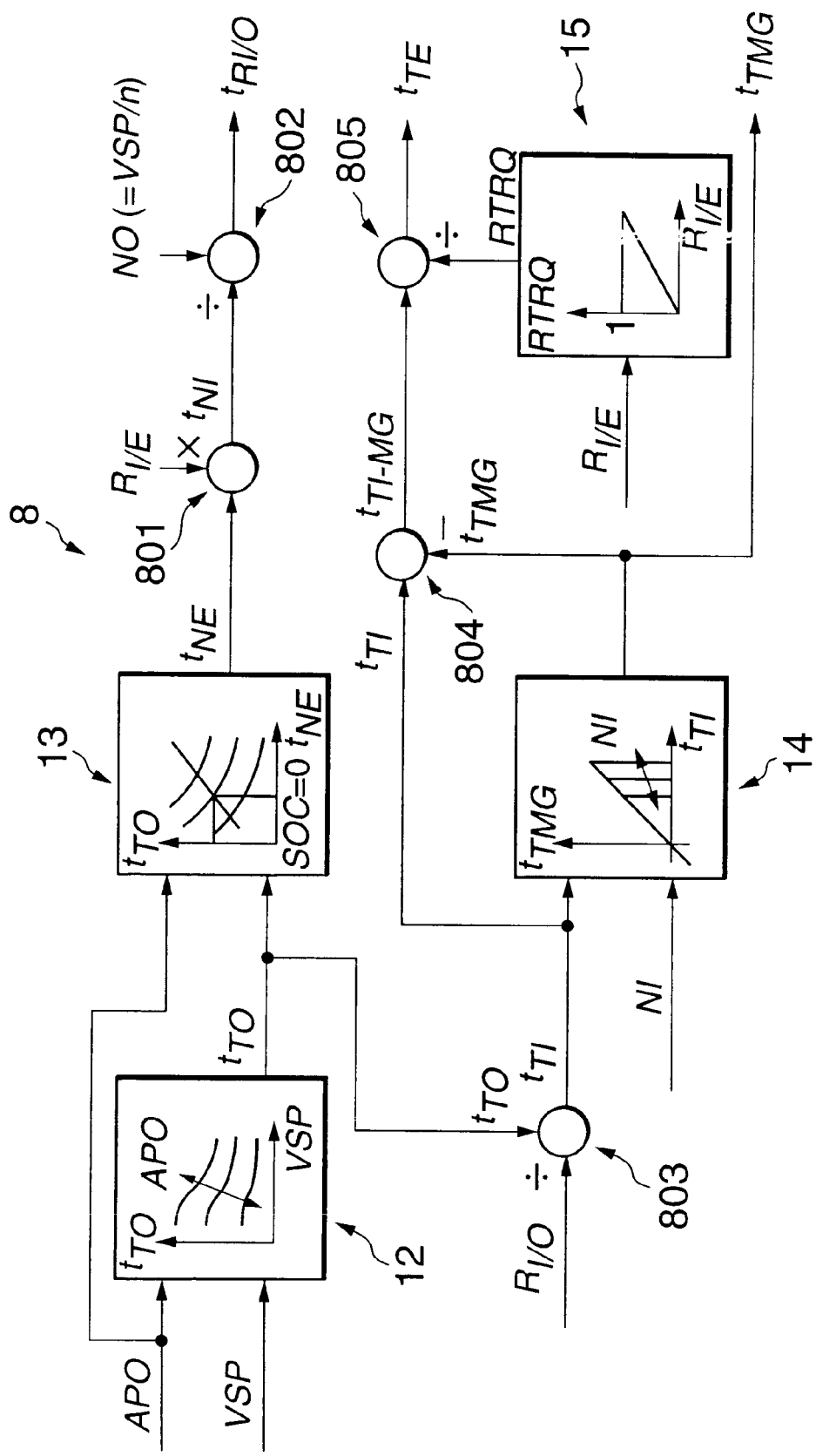
FIG. 4 is a block diagram which describes the data processing of a target speed ratio, target engine torque and target generator torque performed by a target value setting controller according to this invention.

Next, referring to the flowchart of FIG. 9 and the block diagram of FIG. 4, the process of calculating the target speed ratio $t_{RI/O}$, target engine torque $t_{TE}$ and target motor/generator torque $t_{TMG}$ performed by the target value setting controller 8, will be described.

First, the vehicle speed VSP is read in a step S1, and the accelerator pedal depression amount APO is read in a step S2, respectively.

Figure 5:
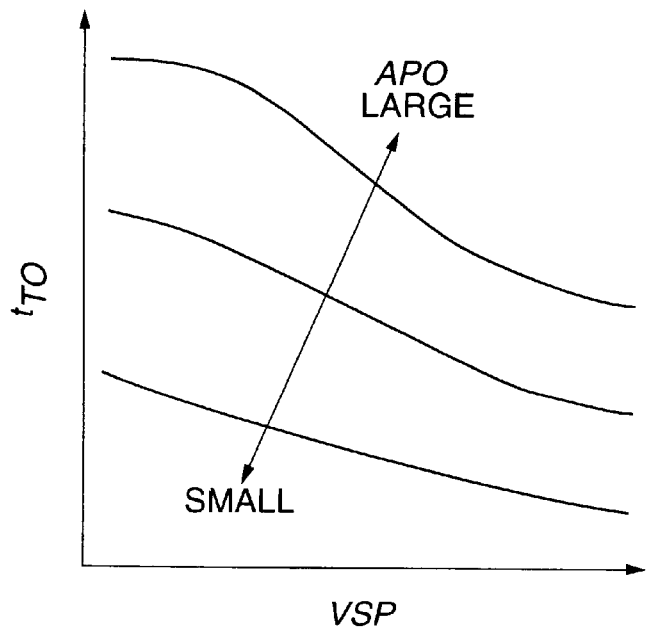
FIG. 5 is a diagram showing a map of a target drive torque stored by the target value setting controller.

In a step S3, a target drive torque $t_{TO}$ is calculated by looking up a map shown in FIG. 5 based on the accelerator pedal depression amount APO and vehicle speed VSP. This corresponds to the process performed by a target drive torque setting unit 12 of FIG. 4.

When the accelerator pedal depression amount APO is fixed, it is considered that the vehicle acceleration requested by the driver is also fixed. In this case, since the rotation speed of the wheels is smaller the lower the vehicle speed VSP, a large drive torque is required to obtain a fixed acceleration.

When the accelerator pedal depression amount APO increases, the driver demands higher acceleration. Tn this case also a large drive torque is required to meet the demand. The map of FIG. 5 expresses this relation graphically, and the target drive torque $t_{TO}$ for achieving the acceleration which the driver desires is calculated by using this map. The calculated target drive torque $t_{TO}$ is equivalent to the output torque of the continuously variable transmission 3.

Figure 6:
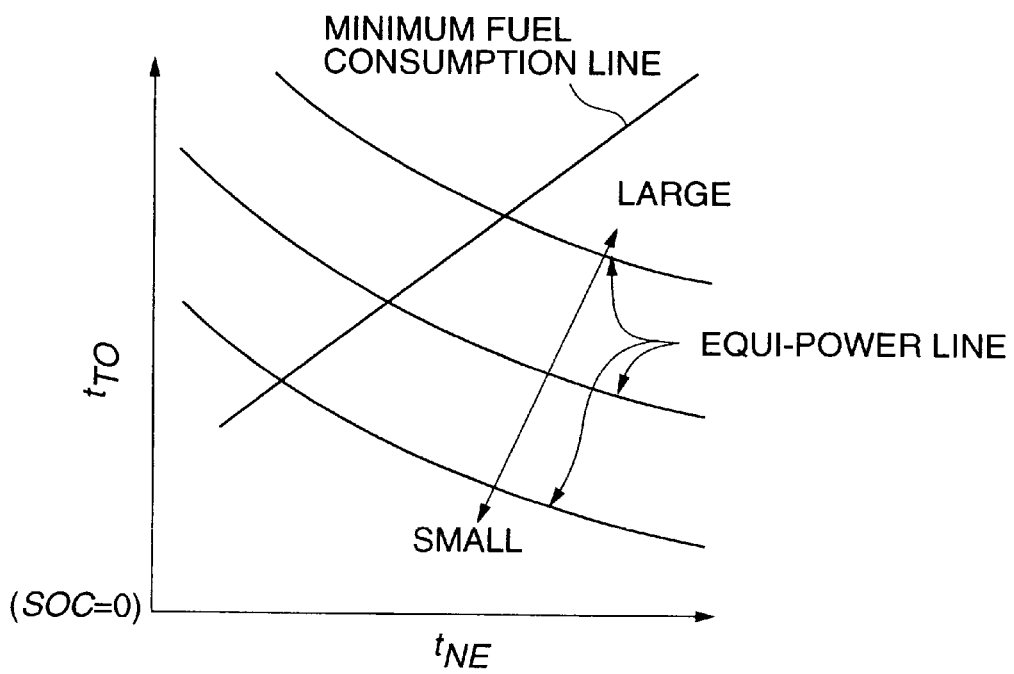
FIG. 6 is a diagram showing a map of a target engine rotation speed stored by the target value setting controller.

In a step S4, the target engine rotation speed $t_{NE}$ is calculated by looking up a map shown in FIG. 6 based on the target drive torque $t_{TO}$. This corresponds to the process performed by a target engine rotation speed setting unit 13 of FIG. 4.

The map of FIG. 6 shows a minimum fuel consumption line by taking the target engine speed engine speed $t_{NE}$ as abscissa, and the target drive torque $t_{TO}$ as ordinate. The minimum fuel consumption line is found from the equi-power lines in the diagram. The power is the product of drive torque and rotation speed, and is an amount of work per unit time. The line which joins the points of least fuel consumption on respective equi-power lines is that of minimum fuel consumption.

In a step S4, a target engine rotation speed $t_{NE}$ which corresponds to a point on the minimum fuel consumption line corresponding to the target drive torque $t_{TO}$ is calculated.

In a step S5, the real engine rotation speed NE and the real input rotation speed NI of the continuously variable transmission 3 are read, and the ratio $R_{I/E}$ which is the ratio of these two parameters is calculated.

In a step S6, the target engine rotation speed $t_{NE}$ calculated in the step S4 is multiplied by the ratio $R_{I/E}$ to calculate the target input rotation speed $t_{NI}$ input to the continuously variable transmission 3. This corresponds to the process performed by a multiplier 801 of FIG. 4.

In a step S7, the real power output rotation speed NO of the continuously variable transmission 3 is read.

In a step S8, the real power output rotation speed NO of the continuously variable transmission 3 is divided by the target input rotation speed $t_{NI}$ to calculate the target speed ratio $t_{RI/O}$ of the continuously variable transmission 3. This corresponds to the process performed by a divider 802 of FIG. 4.

Hence, if the target speed ratio $t_{RI/O}$ and the target drive torque $t_{TO}$ thus calculated are achieved, the acceleration desired by the driver is attained, while fuel consumption is suppressed to the minimum.

In a step S9, the real speed ratio $R_{I/O}$ of the continuously variable transmission 3 which the transmission controller 7 calculated, is read.

In a step S10, the target drive torque $t_{TO}$ calculated in the step S3 is divided by the real speed ratio $R_{I/O}$, and a target combined torque $t_{TI}$ of the engine 1 and motor/generator 2 is calculated. This corresponds to the process performed by a divider 803 of FIG. 4. This calculation is based on the fact that the torque ratio is equivalent to the inverse of the speed ratio.

Figure 7:
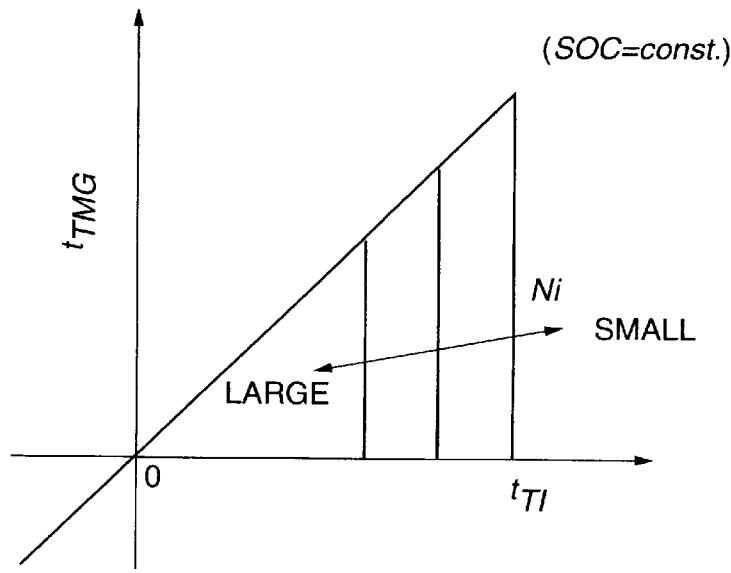
FIG. 7 is a diagram showing a map of a target motor/generator torque stored by the target value setting controller.

In a step S11, a target motor/generator torque $t_{TMG}$ is calculated by looking up a map shown in FIG. 7 based on the target combined torque $t_{TI}$ and the input rotation speed NI of the continuously variable transmission 3. This corresponds to the process performed by a target motor/generator torque setting unit 14 of FIG. 4.

In general, the torque of the engine 1 is low in a low rotation speed region below a certain level, and it is difficult to obtain the required power with good fuel cost-performance in the low rotation speed region.

On the other hand, when the motor/generator is driven as a motor, the output is fixed (which is a characteristic of a motor), and a large torque cannot be obtained in the high rotation speed region. In other words, a small torque can be output efficiently.

In the map of FIG. 7, taking the target combined torque $t_{TI}$ as abscissa and the target motor/generator torque $t_{TMG}$ as ordinate, the target motor/generator torque $t_{TMG}$ is made to increase linearly in the region where the target combined torque $t_{TI}$ is small, and the target combined torque $t_{TI}$ is provided entirely by the motor/generator 2.

When the target combined torque $t_{TI}$ exceeds a predetermined value, the target motor/generator torque $t_{TMG}$ is set to 0, and the target combined torque $t_{TI}$ larger than this predetermined value is set to be provided entirely by the engine 1.

However, as the rotation speed is a determinant factor in the torque characteristics of the engine 1, when the input engine speed NI is small, the point at which the target motor/generator torque $t_{TMG}$ changes over to 0 should be displaced to the right of the figure, i.e. in the increase direction of the target combined torque $t_{TI}$. Therefore, plural maps are prepared according to the input engine speed N1. It should be noted that the reason why the input rotation speed NI and not the engine rotation speed NE is used as a parameter is because the torque ratio RTRQ is interposed between these two.

Thus, when the target motor/generator torque $t_{TMG}$ determined in this way is attained, the motor/generator 2 can supply torque efficiently.

In a step S12, the target motor/generator torque $t_{TMG}$ is subtracted from the target combined torque $t_{TI}$. This corresponds to the process performed by a subtractor 804 of FIG. 4.

Figure 8A:
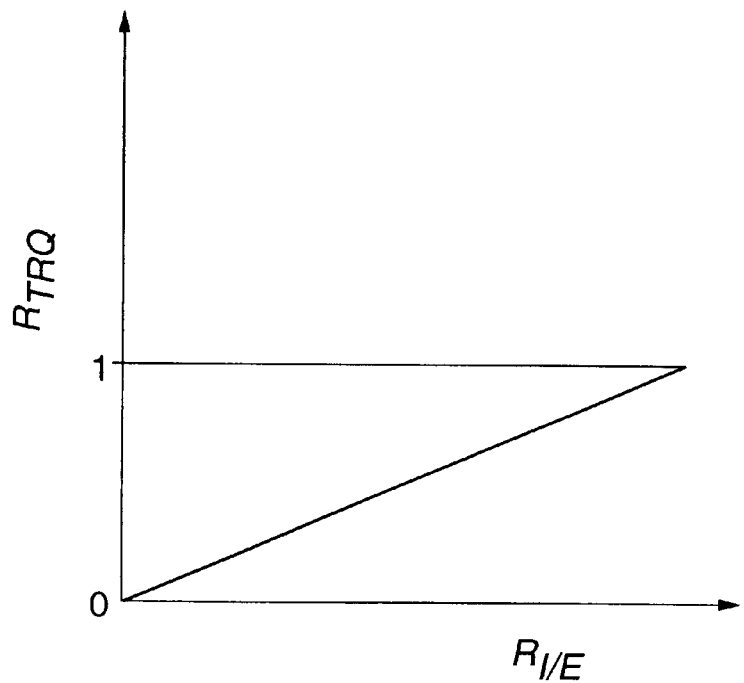
FIGS. 8A and 8B are diagrams showing a map of a torque ratio stored by the target value setting controller.

In a step S13, the torque ratio RTRQ is set by looking up a map shown in FIG. 8A based on the above-mentioned ratio $R_{I/E}$. As the electromagnetic clutch 10 is interposed between the engine 1 and the continuously variable transmission 3, the rotation speed NE of the output shaft 1A of the engine 1 is different from the rotation speed NI of the input shaft 3A of the continuously variable transmission 3, and the torque ratio RTEQ of the two also varies according to their speed ratio $R_{I/E}$. The torque ratio RTEQ calculated in the step S13 is a coefficient for compensating this difference, and this corresponds to the process performed by a torque ratio setting unit 15 of FIG. 4.

Finally, in a step S14, a target input torque $t_{TI.MG}$ is divided by the torque ratio RTRQ to calculate the target engine torque $t_{TE}$. This corresponds to the process performed by a divider 805 of FIG. 4.

If the engine controller 5 achieves this target engine torque $t_{TE}$, and the motor/generator controller 6 achieves the target motor/generator torque $t_{TMG}$, the target combined torque $t_{TI}$, i.e., the target drive torque $t_{TO}$, can be generated with minimum fuel consumption, hence the dual objectives of good fuel cost-performance and good acceleration performance can be realized.

Figure 8B:
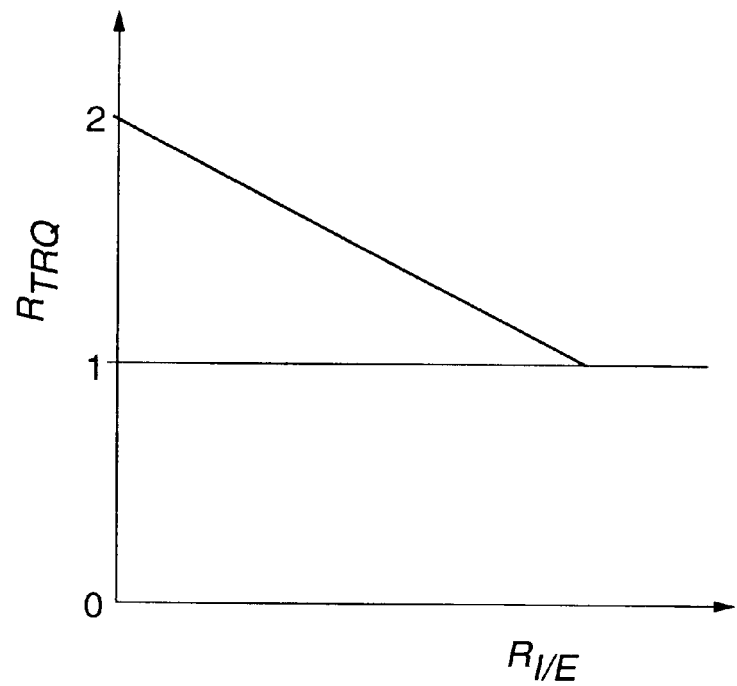

According to this embodiment, the electromagnetic clutch 10 was interposed between the engine 1 and the continuously variable transmission 3, however a torque converter may be used instead of the electromagnetic clutch 10. In this case, the torque ratio RTRQ becomes larger, when the ratio $R_{I/E}$ is smaller and its maximum value is 2. Therefore, a map shown in FIG. 8B is used instead of the map shown in FIG. 8A in the step S13 or the torque ratio setting unit 15.

Next, a second embodiment of this invention will be described referring to FIGS. 10–13.

In this embodiment, when a charge amount SOC of the battery 11 is large, the extent to which the target motor/generator torque $t_{TMG}$ can be increased is extended in conformance with the target combined torque $t_{TI}$.

Figure 11:
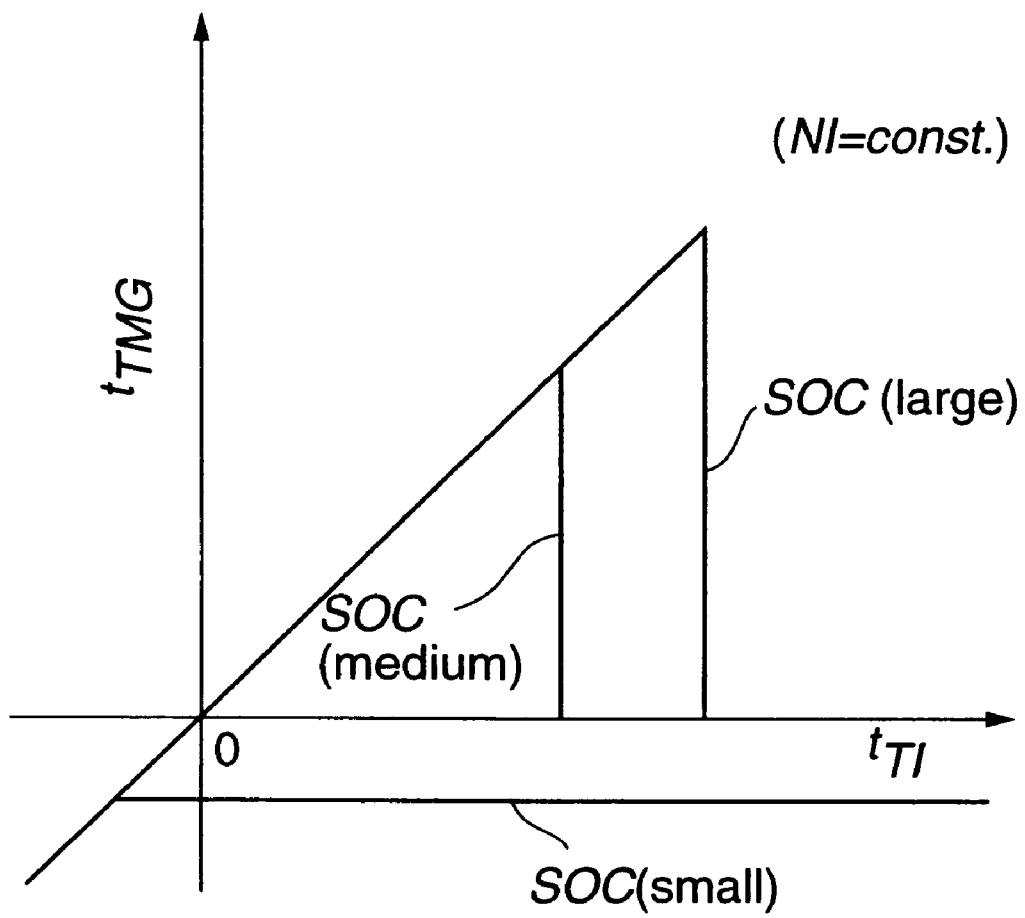
FIG. 11 is similar to FIG. 7, but showing the second embodiment of this invention.
Figure 12:
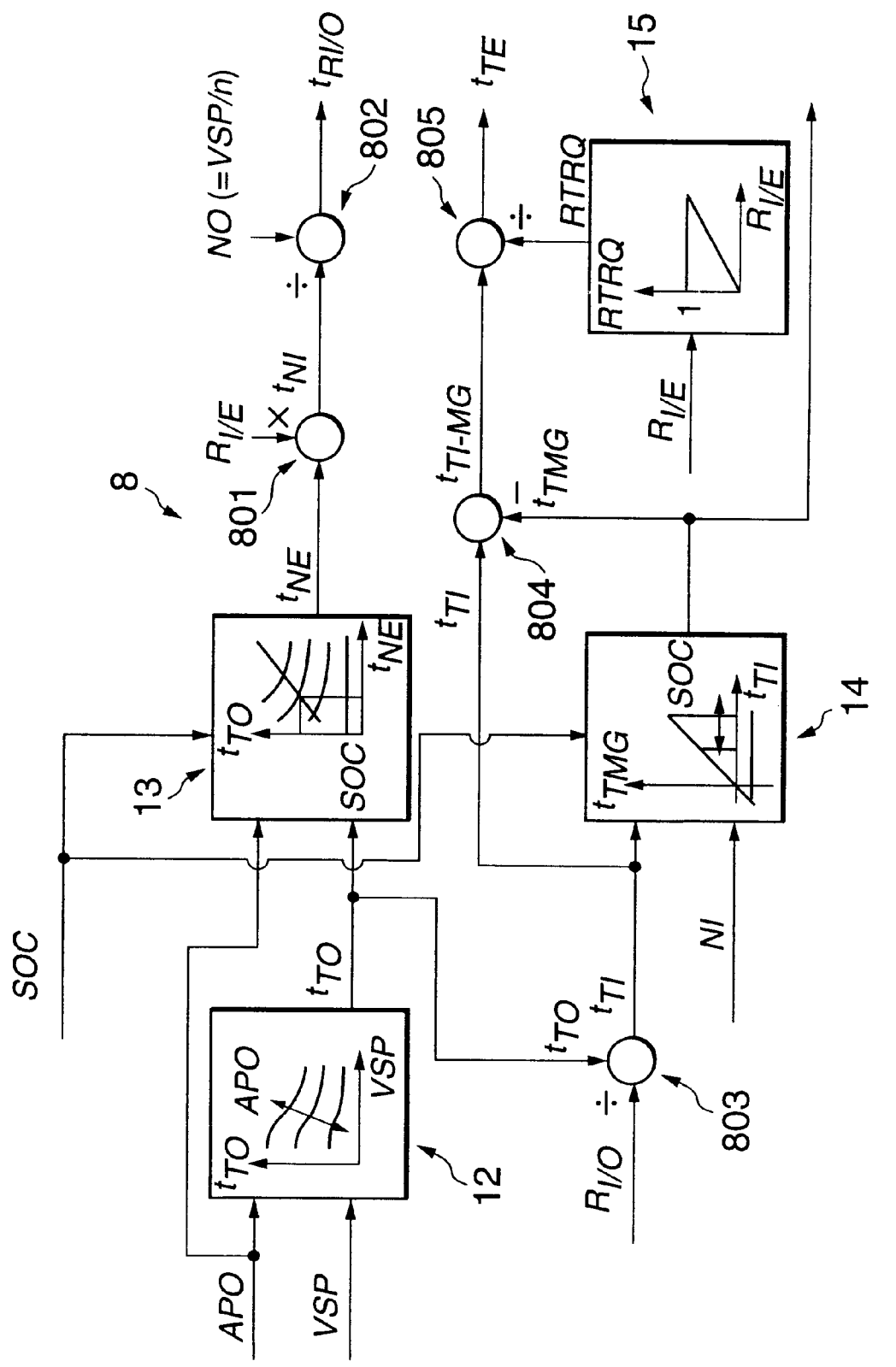
FIG. 12 is similar to FIG. 4, but showing the second embodiment of this invention.

This is to prevent overcharging of the battery 11 and economize fuel when the charge amount SOC is large, by intensive use of the motor/generator 2. On the other hand, when the charge amount SOC of the battery 11 is small, the motor generator 2 is driven as a generator despite the increase of fuel consumption, and the battery 11 is charged. Therefore in this particular case, as shown in FIG. 11, the target generator torque $t_{TMG}$ is set to a negative constant value regardless of the target combined torque $t_{TI}$. When the charge amount SOC is larger, the aforesaid increase limit is determined according to the value of SOC.

For this reason, as shown in FIG. 3, a signal showing the charge amount SOC is input to the motor/generator controller 6 from the battery 11.

Figure 13:
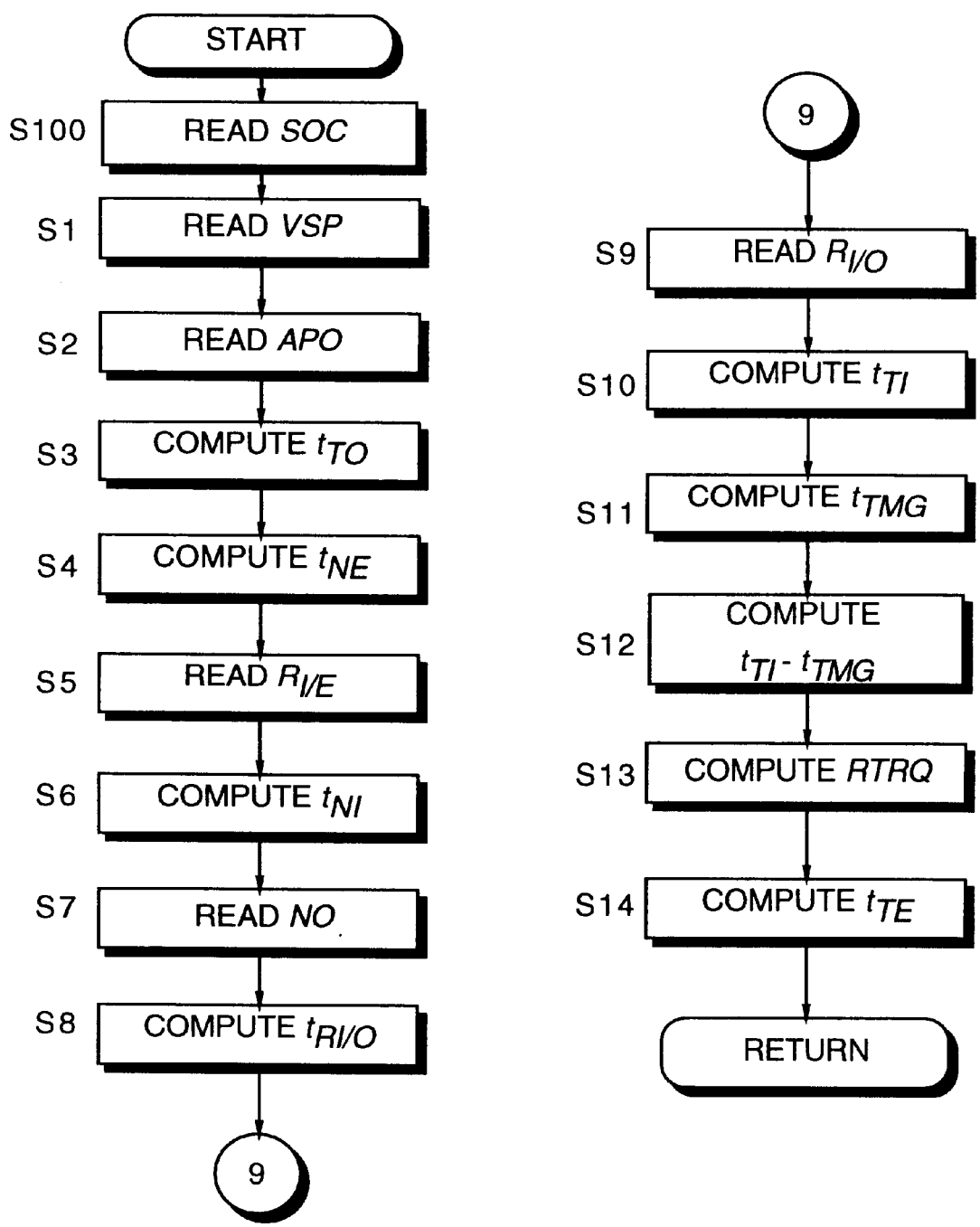
FIG. 13 is similar to FIG. 9, but showing the second embodiment of this invention.

As shown by the flowchart of FIG. 13, a step S100 which reads the charge amount SOC is provided before the step S1 of the computing process of the target value setting controller 8. Furthermore, the details of the processing performed by the target engine rotation speed setting unit 13 and the target motor/generator torque setting unit 14 are different from those of the above-mentioned first embodiment.

Figure 10:
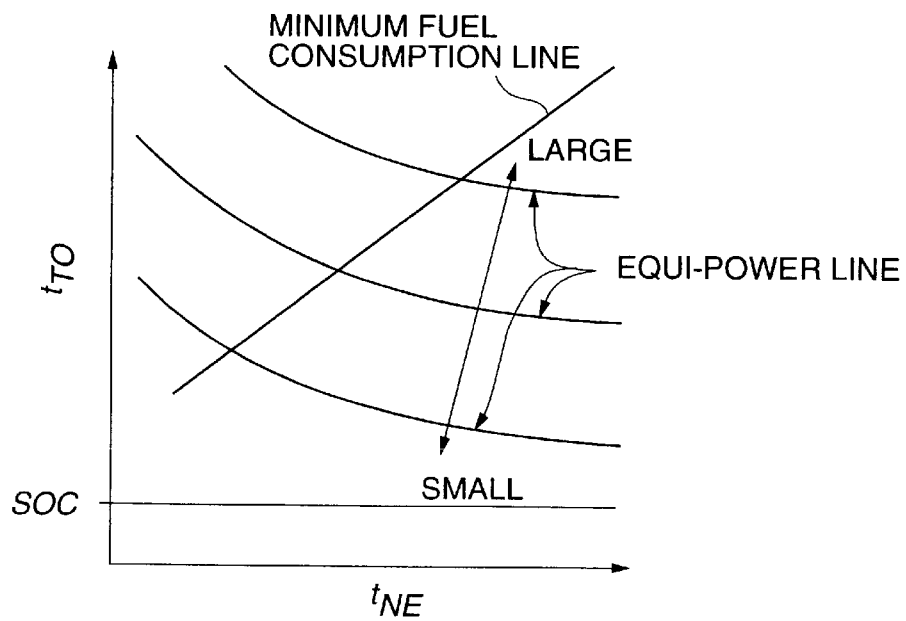
FIG. 10 is similar to FIG. 6, but showing a second embodiment of this invention.

First, the target engine rotation speed setting unit 13 sets the target engine rotation speed $t_{NE}$ using a map of FIG. 10 instead of the map of FIG. 6. The difference between this map and the map of FIG. 6 is that the battery charge amount SOC is added to the parameters for determining the target engine rotation speed $t_{NE}$. Compared to the map of FIG. 6, in the map of FIG. 10, the value of the target drive torque $t_{TO}$ is set larger by an amount corresponding to the charge amount SOC for the same target engine rotation speed $t_{NE}$. In other words, a larger target engine speed $t_{NE}$ is given for the same target drive torque $t_{TO}$.

The target motor/generator torque setting unit 14 calculates the target motor/generator torque $t_{TMG}$ using the map of FIG. 11 instead of the map of FIG. 7. The difference between this map and the map of FIG. 7 is that the charge amount SOC of the battery 11 is added to the parameters for determining the target motor/generator torque $t_{TMG}$. According to this map, the upper limit of the target motor/generator torque $t_{TMG}$ is set larger for the same input rotation speed NI, the larger the charge amount SOC. In the target value setting controller 8, plural maps are prepared for various input rotation speeds NI and are applied selectively.

Hence, as described hereabove, proper use of the motor generator 2 is achieved according to the charge amount SOC of the battery 11, and an optimum drive force is obtained which reconciles the dual objectives of acceleration performance and fuel cost-performance.

Next, a third embodiment of this invention will be described referring to FIGS. 14–17.

Figure 9:
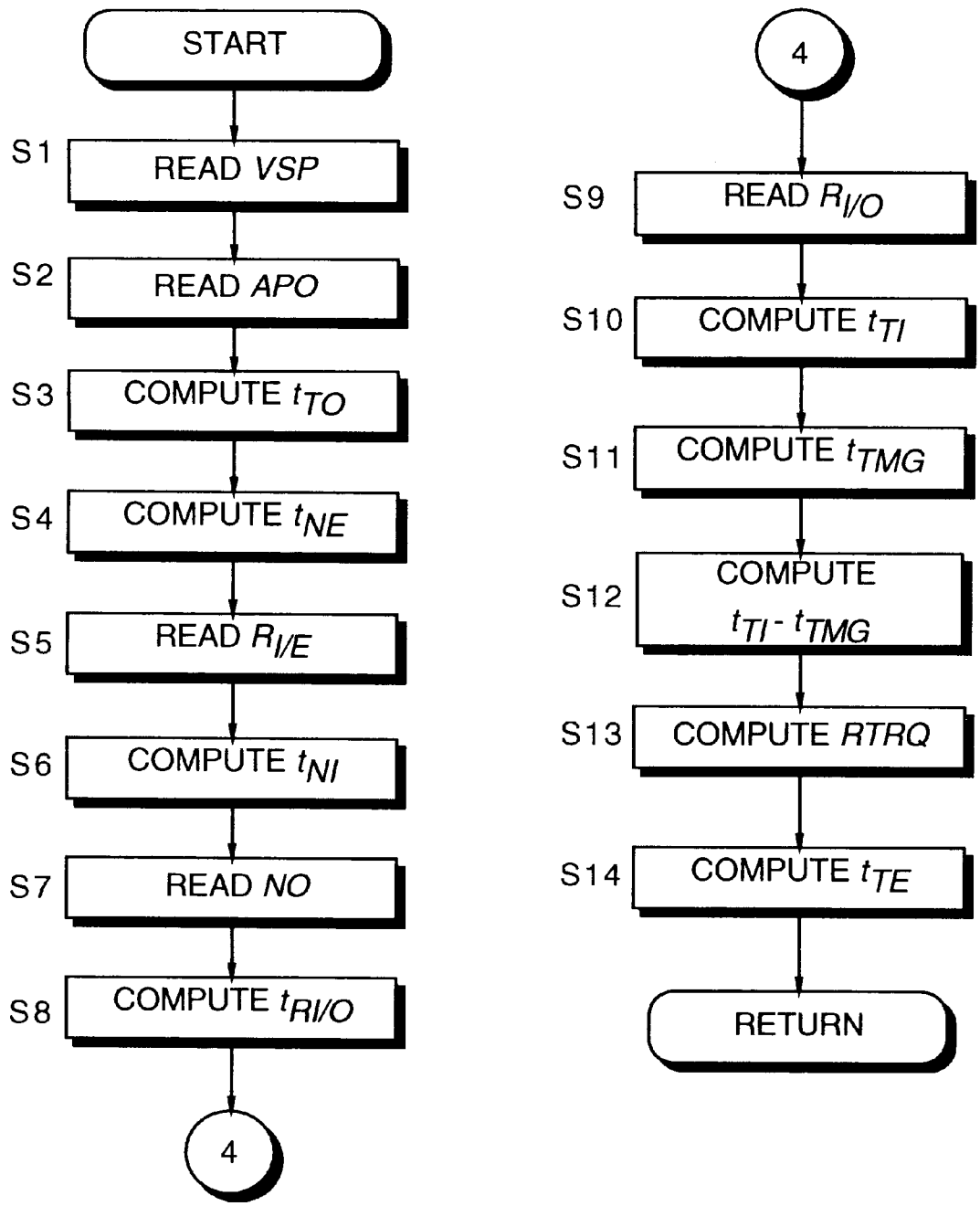
FIG. 9 is a flowchart describing a process of computing the target speed ratio, target engine torque and target generator torque performed by the target value setting controller.
Figure 17:
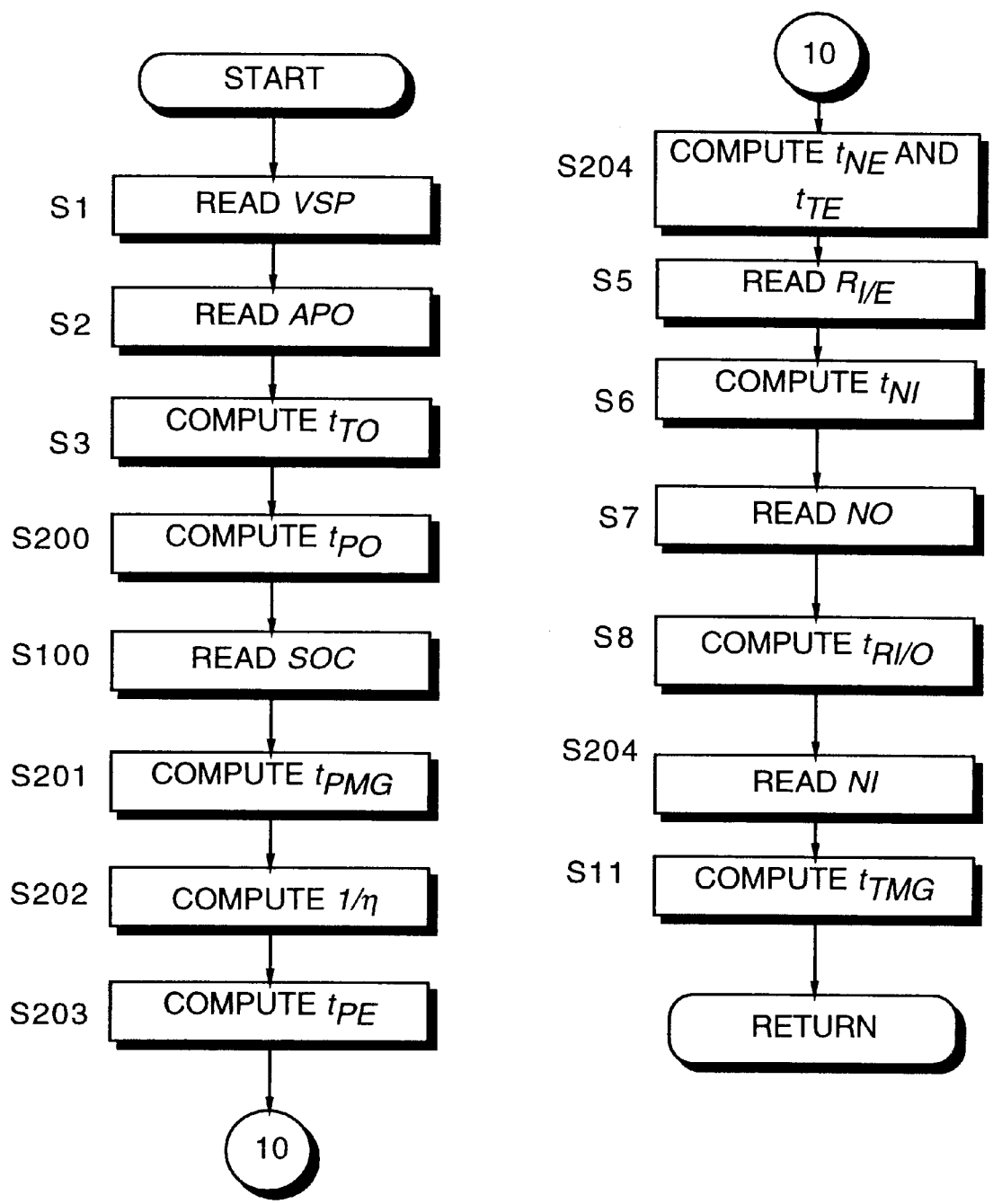
FIG. 17 is similar to FIG. 9, but showing the third embodiment of this invention.

In this embodiment, the flowchart shown in FIG. 17 is applied instead of the flowchart of FIG. 9 of the aforesaid first embodiment for the computing process by the target value setting controller 8. This is equivalent to a modification of the block diagram from FIG. 4 to FIG. 14. The structure of the hardware is the same as that of the above-mentioned second embodiment.

In this embodiment, after the target value setting controller 8 conputes the target drive torque $t_{TO}$ in a step S3, the vehicle speed VSP is multiplied by the target drive torque $t_{TO}$ in a step S200, and the target drive power $t_{PO}$ is computed. This step corresponds to the processing of a multiplier 811 of FIG. 14.

Next, the battery charge amount SOC is read in a step S100.

Figure 15:
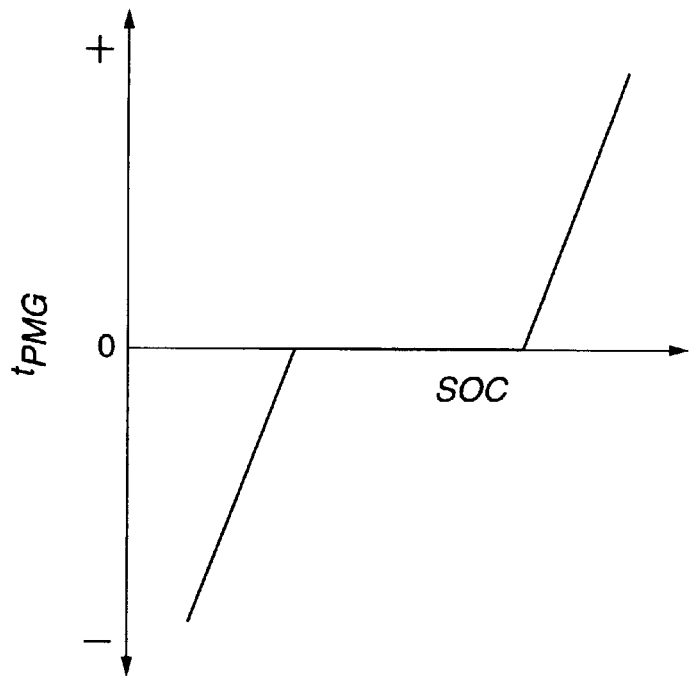
FIG. 15 is a diagram describing a map of required motor power stored by the target value setting controller according to the third embodiment.

In a step S201, a map shown in FIG. 15 is looked up based on the battery charge amount SOC, and a target motor power $T_{PMG}$ is calculated. In this map, in order to drive the motor/generator 2 as a motor when the battery charge amount SOC is large, the target motor power $T_{PMG}$ is a positive value.

When the battery charge amount is small, in order to drive the motor/generator 2 as a generator, the target motor power $T_{PMG}$ is a negative value. When the battery charge amount SOC is intermediate, the target motor power $T_{PMG}$ is 0. This processing corresponds to the process performed by a target motor power setting unit 22 of FIG. 14.

In the following step S202, a charging efficiency $1/\eta$ of the battery 11 from the motor/generator 2 via the inverter 201 is read. The charging efficiency $1/\eta$ is the inverses of an output efficiency $\eta$. This is a constant determined according to the specification of the device, and is prestored in the memory of the target value setting controller 8.

In the following step S203, the charging efficiency $1/\eta$ is multiplied by the target motor power $t_{PMG}$ to convert it to an engine power equivalent amount, and the engine power equivalent amount is subtracted from the target drive power $t_{PO}$ calculated in the step S200 to calculate a target engine power $t_{PE}$. This process corresponds to the processing of an efficiency multiplier 23 and a subtractor 812 of FIG. 14.

Figure 16:
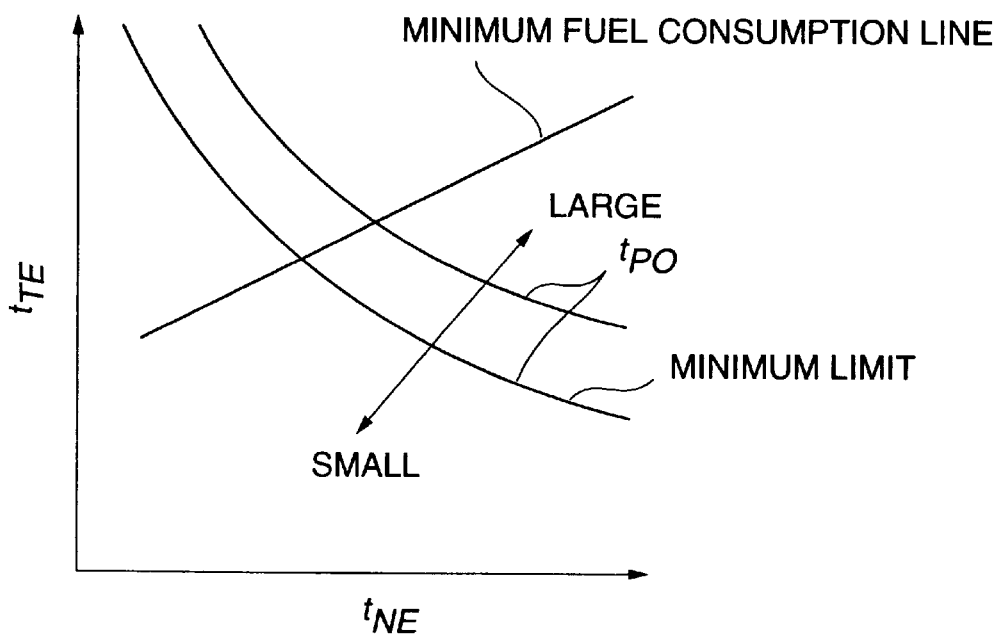
FIG. 16 is a diagram describing a map specifying a relation between a target engine rotation speed and target engine torque stored by the target value setting controller according to the third embodiment.

In a step S204, the target engine torque $t_{TE}$ and the target engine rotation speed $t_{NE}$ are calculated from the target engine power $t_{PE}$ by looking up a map shown in FIG. 16.

This map is the same as that of the map of FIG. 6 of the aforesaid first embodiment.

Here, an equi-power line equivalent to the target engine power $t_{PE}$ is selected, and the target engine torque $t_{TE}$ and target engine rotation speed $t_{NE}$ corresponding to the intersection of the selected equi-power line and minimum fuel consumption line are read. This process corresponds to the processing of a target engine torque/rotation speed setting unit 24 shown in FIG. 14.

In this map, a permitted minimum value of the target engine power $t_{PE}$ is set, and if the target engine power $t_{PE}$ is less than this permitted minimum value, both the target engine speed $t_{NE}$ and target engine torque $t_{TE}$ are set to 0. This is because when the target engine power $t_{PE}$ is low, the rotation speed of the engine 1 is also low, and the engine 1 cannot supply a large power. In such a case, the vehicle is driven by the motor/generator 2.

Subsequently, the target value setting controller 8 performs the same processing as that of the steps S5–S8 of the aforementioned first embodiment, and calculates the target speed ratio $t_{RI/O}$.

Also in the step S204, the input rotation speed NI of the continuously variable transmission 3 is read, and the required engine power $t_{PE}$ is divided by the input rotation speed NI in the step S11 to determine the target motor/generator torque $t_{TMG}$.

Figure 14:
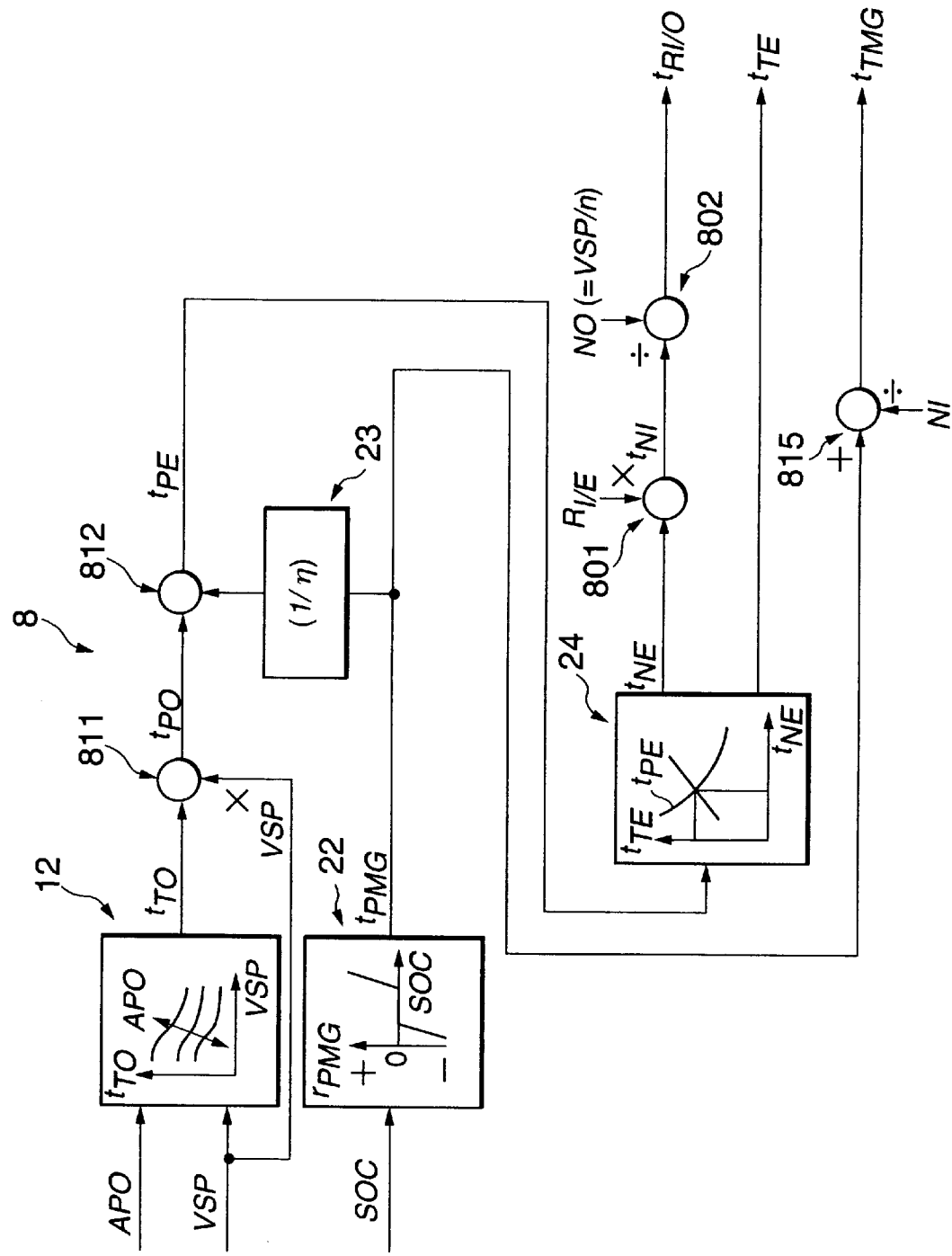
FIG. 14 is similar to FIG. 4, but showing a third embodiment of this invention.

This process corresponds to a processing of the divider 815 shown in FIG. 14.

In this embodiment, as in the aforementioned second embodiment, the motor/generator 2 is used appropriately according to the charge amount SOC of the battery 11, and an optimum drive force which reconciles the dual objectives of acceleration and fuel cost-performance is obtained.

Also in this embodiment, the torque correction by the divider 805 of the aforesaid first and second embodiments may be applied to the target engine torque $t_{TE}$.

Next, a fourth embodiment of this invention will be described referring to FIGS. 18–20.

In this embodiment, the aforesaid battery charging efficiency $1/\eta$ is modified according to battery temperature.

For this purpose, as shown in FIG. 3, the drive force controller of this embodiment is provided with a temperature sensor 202 which detects the temperature $TMP_{BTT}$ of the battery 11, and inputs a corresponding signal into the motor/generator controller 6. The structure of the remaining hardware is the same as that of the above second and third embodiments.

Figure 20:
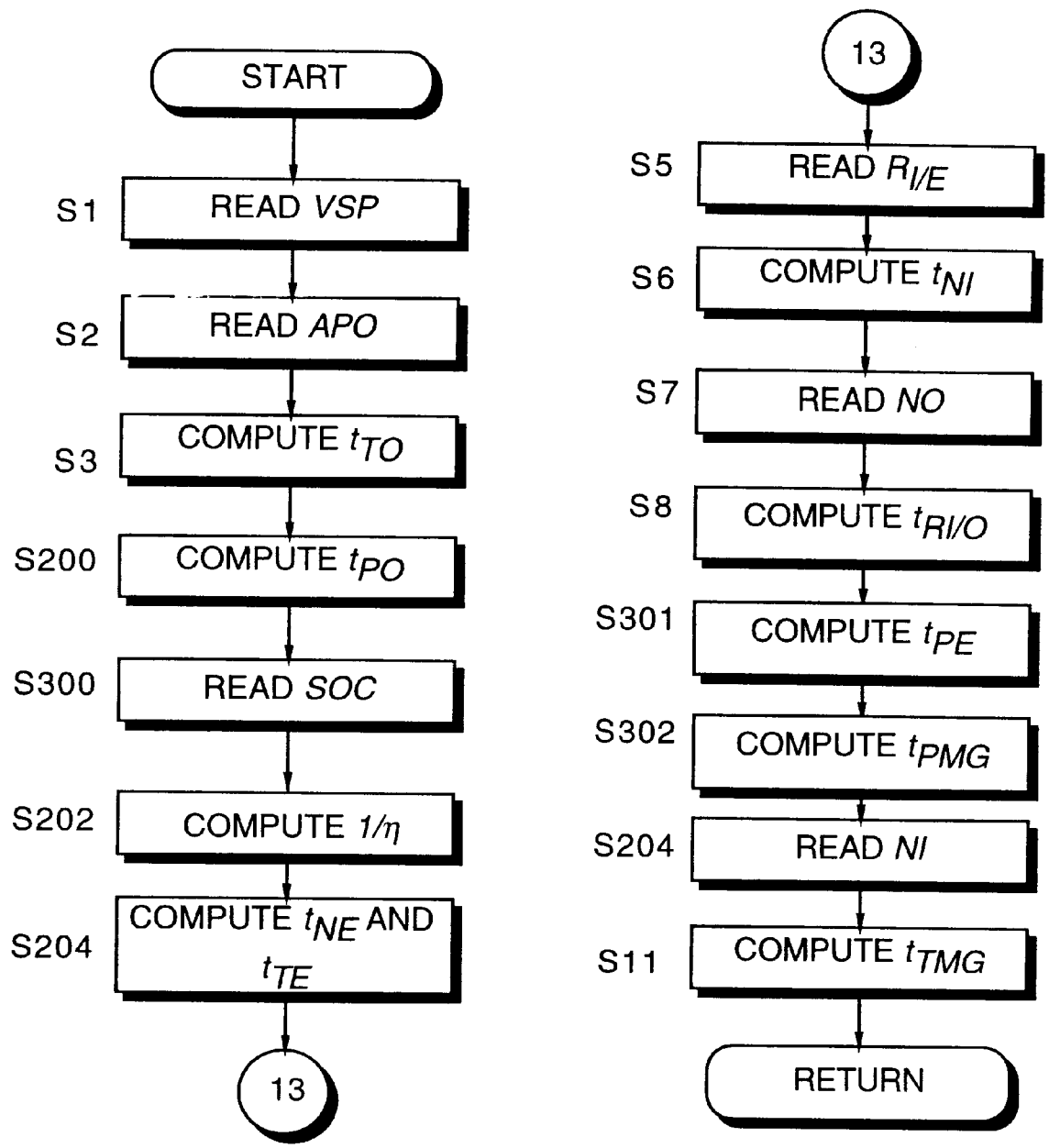
FIG. 20 is similar to FIG. 9, but showing the fourth embodiment of this invention.

In this embodiment, a flowchart of FIG. 20 is used instead of the flowchart of FIG. 17 in the computing process of the target value setting controller 8. This is equivalent to a modification from FIG. 4 to FIG. 18 in the block diagrams.

In this embodiment, a step S300 is performed instead of the step S202 of the aforesaid third embodiment. In the step S300, the battery temperature $TMP_{BTT}$ is read. In the following step S202, the battery charging efficiency $1/\eta$ is determined from the battery temperature $TMP_{BTT}$ by looking up a map shown in FIG. 19. This process corresponds to the processing performed by a battery charging efficiency setting unit 26 of FIG. 18.

Next, the target engine torque $t_{TE}$ and target engine rotation speed $t_{NE}$ are determined in the step S204. Here, unlike the case of the above-mentioned third embodiment, the direct target engine torque $t_{TE}$ and target engine rotation speed $t_{NE}$ are calculated using the target drive power $t_{PO}$ calculated by the multiplier 811 shown in FIG. 18, and the battery charging efficiency $1/\eta$. The map used here is a map set so that the target engine power $t_{TE}$ of the map of FIG. 16 is replaced by the target drive power $t_{PO}$, and the minimum value of the target drive power $t_{PO}$ becomes smaller when the battery charging efficiency $1/\eta$ is smaller.

Therefore when the battery charging efficiency $1/\eta$ is low, the usage rate of the engine 1 increases, and when the battery charging efficiency $1/\eta$ is high, the usage rate of the motor/generator 2 increases.

By using this map, instead of subtracting the target motor power $t_{PMG}$ from the target drive power $t_{PO}$ as in the third embodiment, the target engine torque $t_{TE}$ and target engine rotation speed $t_{NE}$ can be directly calculated from the target drive power $t_{PO}$ and battery charging rate $1/\eta$.

This embodiment is suitable for a vehicle which mainly uses the power of the engine 1.

After the step S204, the same processing is performed as that of the steps S5–S8 of the above-mentioned first embodiment to calculate the target speed ratio $t_{RI/O}$. In a step S301, the target engine rotation speed $t_{NE}$ is multiplied by the target engine torque $t_{TE}$ to calculate the target engine power $t_{PE}$. This process corresponds to processing performed by the multiplier 819 of FIG. 18.

Further, in a step S302, the motor power $t_{PMG}$ is set.

This is determined by subtracting the target engine power $t_{PE}$ from the target drive power $t_{PO}$ determined in the step S200.

Figure 18:
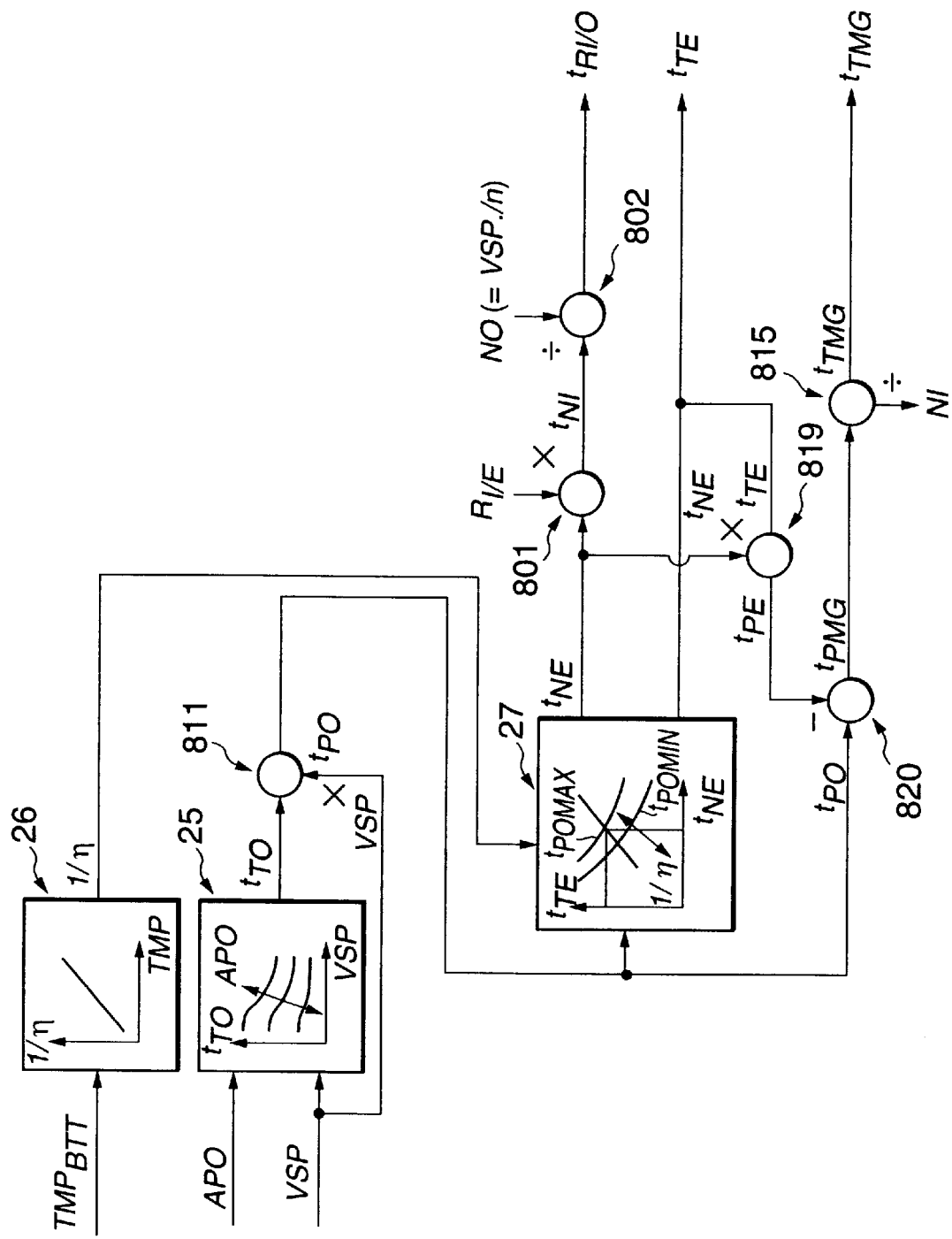
FIG. 18 is similar to FIG. 4, but showing a fourth embodiment of this invention.
Figure 19:
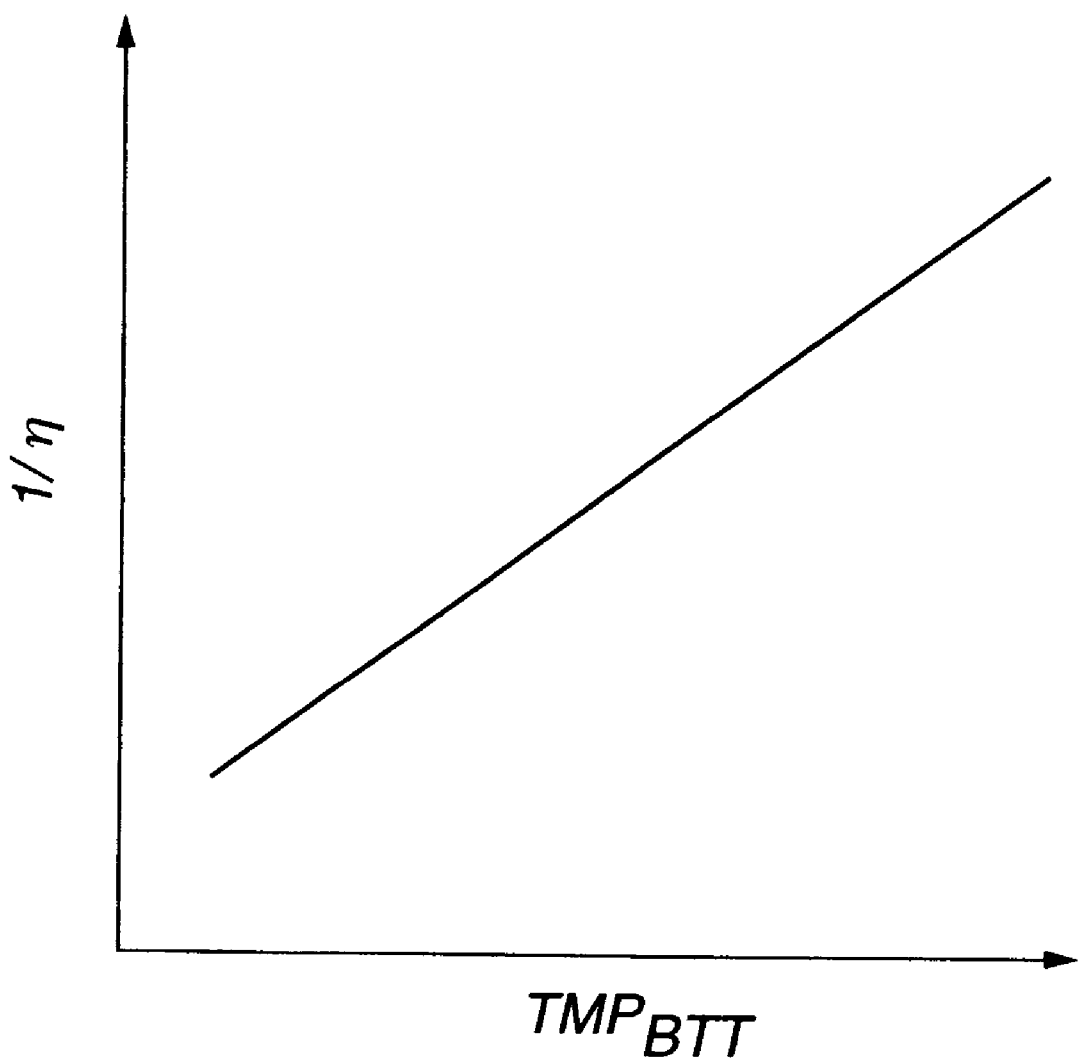
FIG. 19 is a diagram describing a map of a battery charging efficiency stored by the target value setting controller according to the fourth embodiment.

This process corresponds to the processing performed by a subtractor 820 of FIG. 18.

Subsequently, the target motor/generator torque $t_{TMG}$ is computed by dividing the target motor power $t_{PMG}$ by the input rotation speed NI of the continuously variable transmission 3 as in the above-mentioned third embodiment.

According to this embodiment, since the battery charging efficiency $1/\eta$ of the battery is varied according to the battery temperature $TMP_{BTT}$, the charging efficiency $1/\eta$ can be set even more precisely than in the third embodiment.

The permitted minimum value of the target engine power $t_{PE}$ can also be set based on the cooling water temperature TMP of the engine 1 detected by the water temperature sensor 104.

Fuel consumption increases the lower the cooling water temperature TMP, so the usage rate of the motor/generator 2 is increased by increasing the permitted minimum value of the target engine power $t_{PE}$ the lower the cooling water temperature TMP.

Moreover, the permitted minimum value of the target engine power $t_{PE}$ can be varied according to both the battery charging efficiency $1/\eta$ and the cooling water temperature TMP.

In this case, the decrease of cooling water temperature TMP and the decrease of battery charging efficiency $1/\eta$ have contradictory effects on the determination of the permitted minimum value of target engine power $t_{PE}$. Hence in this case, the permitted minimum value is determined as the best compromise value in view of the fuel consumption.

The torque correction of the above first and the second embodiment by the divider 805 may also be applied to the target engine torque $t_{TE}$.

Next, a fifth embodiment of this invention will be described with reference to FIGS. 21–24.

In this embodiment, in addition to the arrangement of the fourth embodiment, an upper limit is applied to the target motor power $t_{PMG}$ according to the battery charging efficiency $1/\eta$, an upper limit is also applied to the target engine power $t_{PE}$, and the setting of a target value which cannot actually be supplied is thereby prevented.

Figure 24:
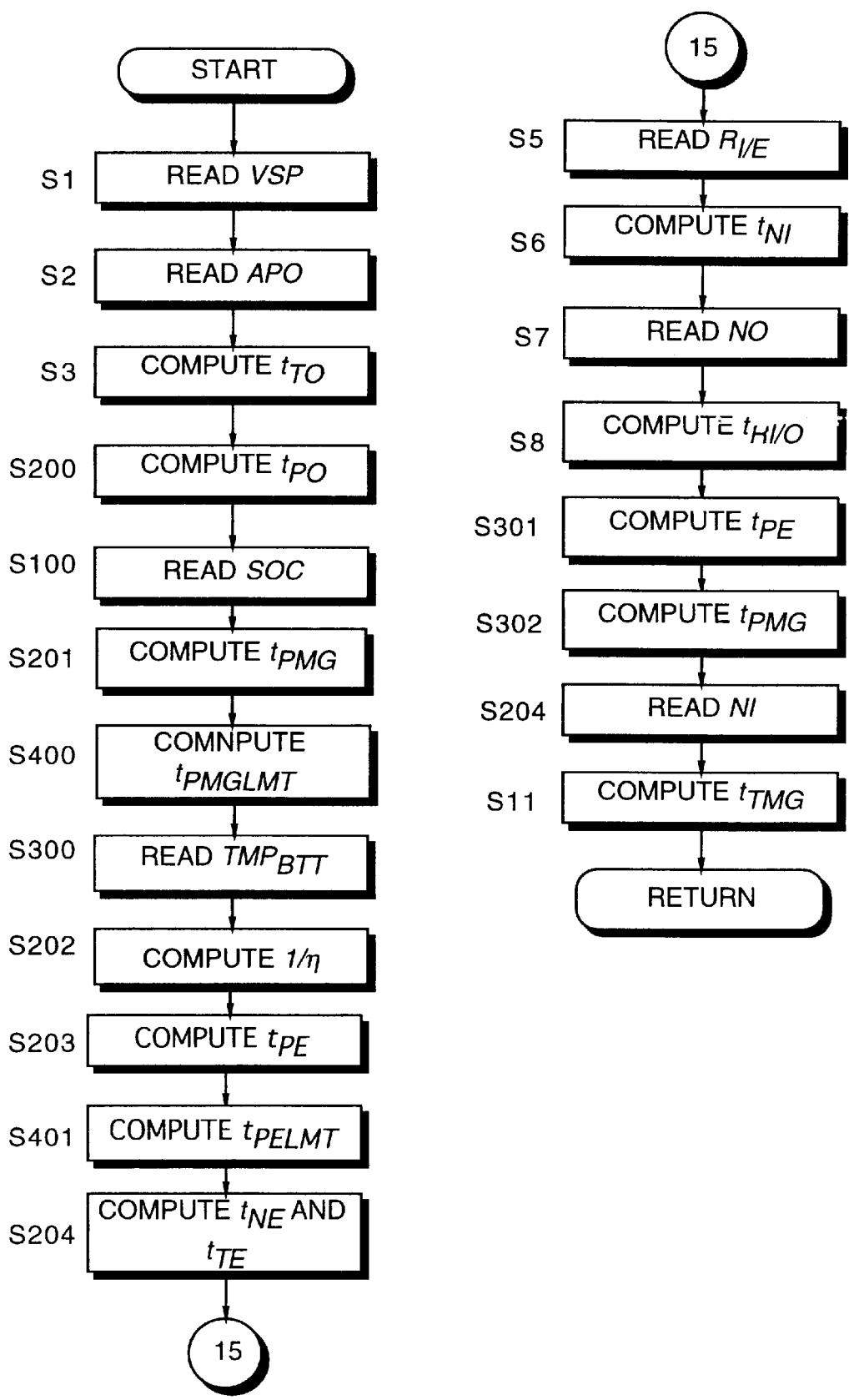
FIG. 24 is similar to FIG. 9, but showing the fifth embodiment of this invention.

For this purpose, the target value setting controller 8 performs a process shown in FIG. 24 instead of the process shown in FIG. 20 of the fourth embodiment. The process of FIG. 24 is equivalent to inserting steps S100, S201 and S400 between the steps S200 and S300, and inserting a step S401 between the steps S203 and S204, of FIG. 20.

Describing this difference in further detail, after setting the target drive power $t_{PO}$ in the step S200 as in the fourth embodiment, the battery charge amount SOC is read in the step S100.

In the following step S201, the target motor power $t_{PMG}$ is calculated as in the third embodiment by a required motor power setting device 22 shown in FIG. 21.

Figure 22:
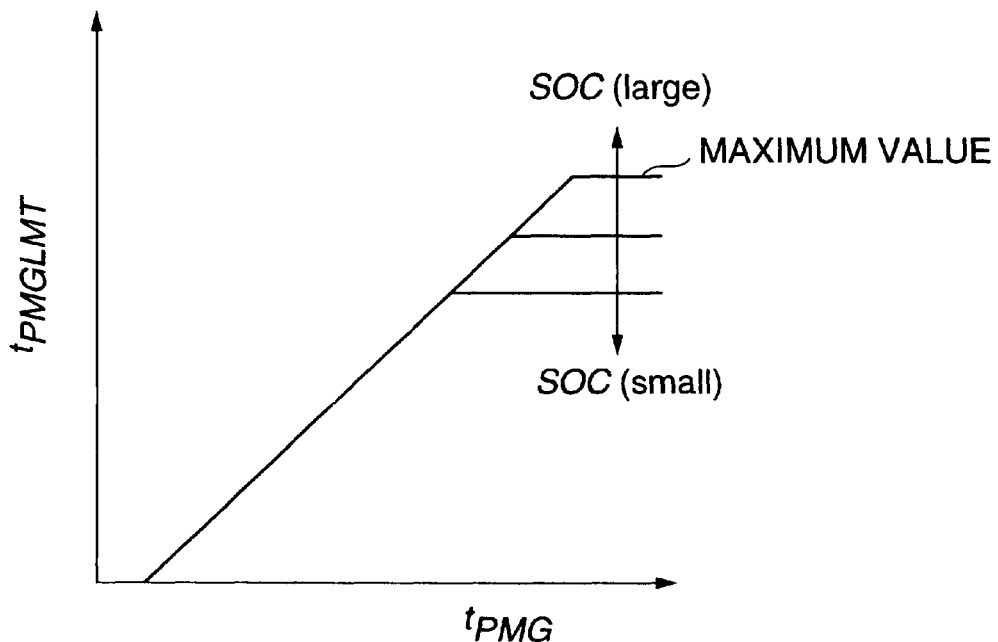
FIG. 22 is a diagram describing a map of target motor power stored by the target value setting controller according to the fifth embodiment.

In the step S400, the target motor power $t_{PMG}$ is limited by looking up a map shown in FIG. 22 based on the battery charge amount SOC. The value obtained after applying the limit is referred to as a processing value $t_{PMGLMT}$.

In FIG. 22, considering the region where the target motor power $t_{PMG}$ is very small as a dead zone, the processing value $t_{PMGLMT}$ is set to 0. When the target motor power $t_{PMG}$ increases from this dead zone, the corresponding processing value $t_{PMGLMT}$ also increases. In the region where the target motor power $t_{PMG}$ is very large, the processing value $t_{PMGLMT}$ is determined by the mechanical operating limit of the motor/generator 2. Since this operating limit varies with the battery charge amount SOC, the upper limit of target motor power $t_{PMG}$ is set lower, the lower the battery charge amount SOC.

In this way, when the battery charge amount SOC is small, as the output of the motor/generator 2 is also small, the setting of a target value exceeding the output which can be supplied by the motor/generator 2 is prevented by setting the upper limit of the target motor power $t_{PMG}$ low. The above process corresponds to the processing performed by a target motor power limiting unit 31 of FIG. 21.

In the following steps S300 and S202, the charging efficiency $1/\eta$ is determined as in the fourth embodiment based on the battery temperature $TMP_{BTT}$.

Figure 21:
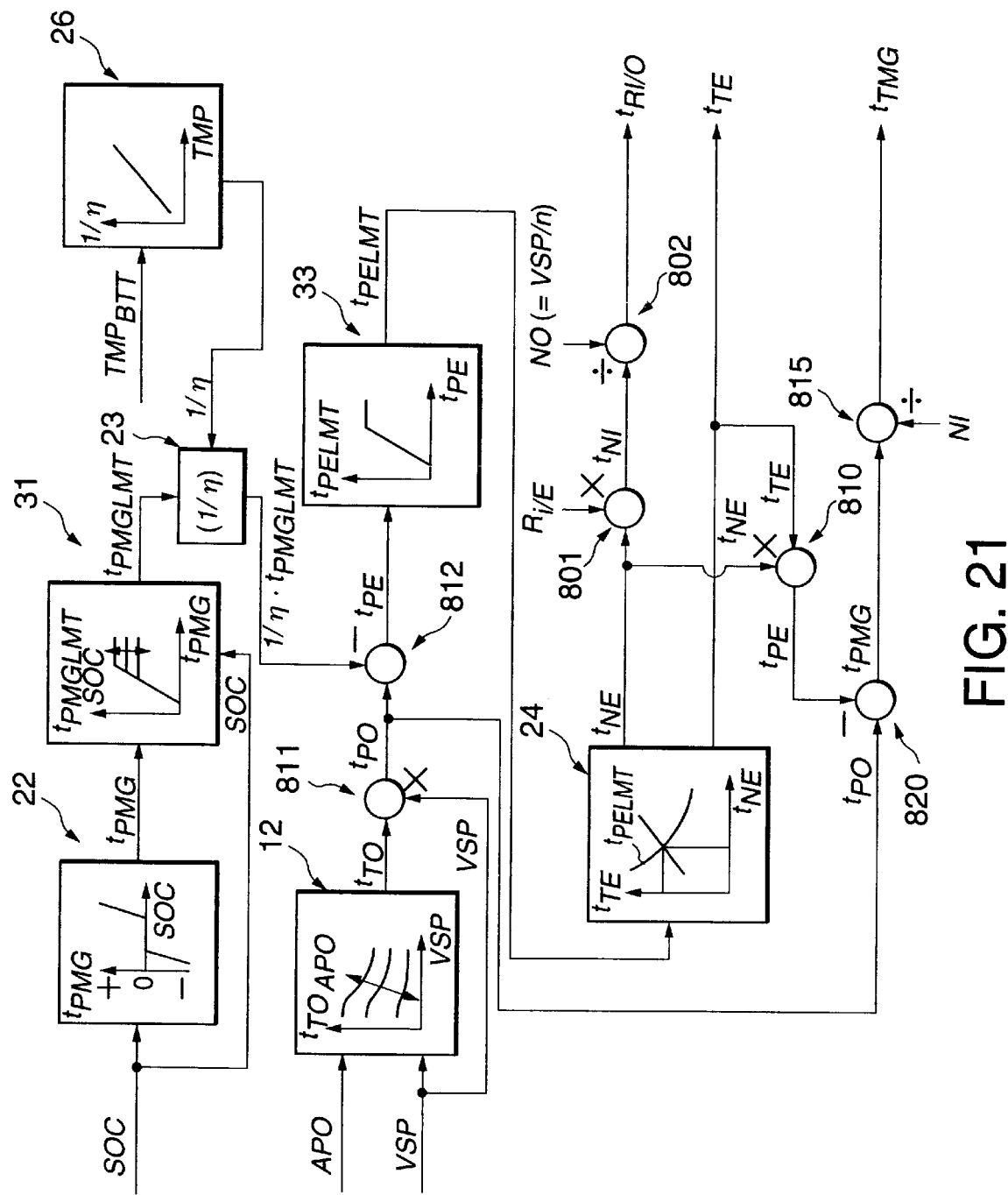
FIG. 21 is similar to FIG. 4, but showing a fifth embodiment of this invention.

In the calculation of the target engine power $t_{TE}$ performed in the step S203, i.e. the subtraction performed by a subtractor 812 of FIG. 21, the target engine power $t_{TE}$ is determined by subtracting the engine power equivalent amount, obtained by multiplying the charging efficiency $1/\eta$ by the processing value $t_{PMGLMT}$, from the target drive power $t_{PO}$.

Figure 23:
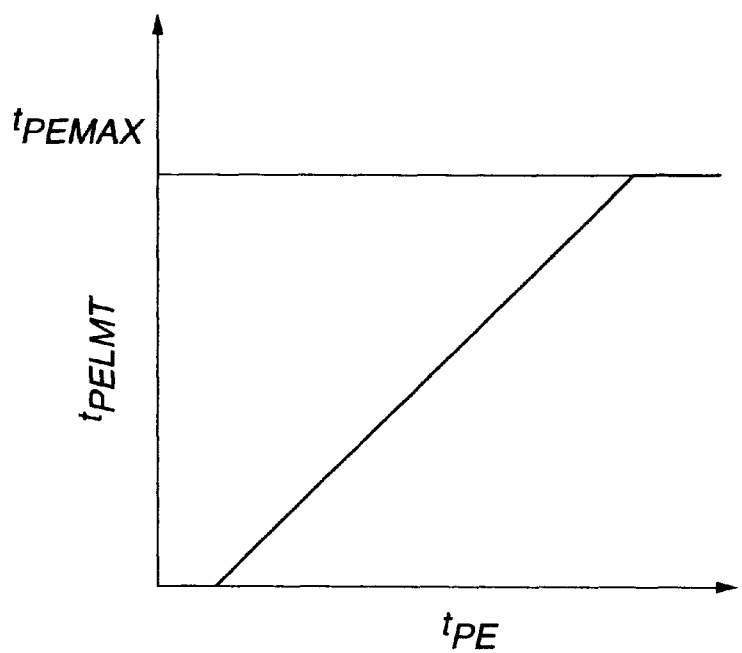
FIG. 23 is a diagram describing a map of a target engine power stored by the target value setting controller according to the fifth embodiment.

In a step S401, also as regards the target engine power $t_{TE}$, a processing value $t_{TELMT}$ of the target engine power is calculated by looking up a map shown in FIG. 23. This process corresponds to the processing performed by a target engine power limiting unit 33 of FIG. 21.

In FIG. 23, considering the region where the target motor power $t_{TE}$ is very small as a dead zone, the processing value $t_{TELMT}$ is set to 0. When the target motor power $t_{TE}$ increases from this dead zone, the corresponding processing value $t_{TELMT}$ also increases. When the target motor power $t_{TE}$ exceeds a certain limit, the processing value $T_{TELMT}$ reaches a maximum value $t_{PEMAX}$ and does not increase beyond this. This upper limit is equivalent to the operating limit of the engine 1.

Thus, the target engine torque $t_{TE}$ and target engine rotation speed $t_{NE}$ are determined in a step S204 using the obtained processing value $t_{TELMT}$. his process is performed by a target engine torque/rotation speed setting unit 24 which is the same as that shown in FIG. 14 of the third embodiment.

The remainder of the process is the same as that of the fourth embodiment.

According to this embodiment, as the target values of motor power and engine power are always within a practical range, the drive force can be controlled to higher precision than in the fourth embodiment.

This invention is applicable also to the drive force control of a vehicle using a motor which does not perform the regeneration operation of the motor/generator 2.

The contents of Tokugan Hei 10-72409 with a filing date of Mar. 20, 1998 in Japan, and Tokugan Hei 11-63834 with a filing date of mar. 15, 1999 in Japan, are hereby incorporated by reference.

Although the invention has been described above by reference to certain embodiments of the invention, the invention is not limited to the embodiments described above. Modifications and variations of the embodiments described above will occur to those skilled in the art, in light of the above teachings. For example, the controllers may be combinations of electronic circuits such as computing circuits instead of microcomputers.

The embodiments of this invention in which an exclusive property or privilege is claimed are defined as follows:

What is claimed is:

1. A hybrid vehicle drive force control device for controlling, according to a depression of an accelerator pedal, an output torque of an engine, an output torque of a motor which varies according to a supply current from a battery, and a speed ratio of a continuously variable transmission which is connected to said engine and said motor, comprising:
   a sensor for detecting a depression amount of said accelerator pedal,
   a sensor for detecting a vehicle speed,
   a sensor for detecting an input rotation speed of said continuously variable transmission,
   a sensor for detecting an output rotation speed of said continuously variable transmission,
   an engine controller for varying said output torque of said engine based on a target engine torque,
   a motor controller for varying said output torque of said motor based on a target motor torque,
   a speed ratio controller for varying said speed ratio of said continuously variable transmission based on a target speed ratio, and
   a microprocessor programmed to:
      set a target drive torque of said vehicle based on said depression amount of said accelerator pedal and said vehicle speed,
      set a target engine rotation speed based on said target drive torque,
      set said target speed ratio based on said target engine rotation speed and said vehicle speed,
      calculate a real speed ratio of said continuously variable transmission from the input rotation speed and output rotation speed of said continuously variable transmission,
      set a target combined torque of said engine and said motor based on said target drive torque and said real speed ratio,
      set said target motor torque based on said target combined torque and said input rotation speed, and
      set said target engine torque based on the difference of said target combined torque and said target motor torque.

2. A drive force control device as defined in claim 1, wherein said motor comprises a motor/generator which operates as a generator according to the input of a rotation torque from said continuously variable transmission.

3. A drive force control device as defined in claim 1, wherein said microprocessor is further programmed to set said target drive torque to be larger when a depression amount of said accelerator pedal is larger, and to set said target drive torque to be smaller when said vehicle speed is slower.

4. A drive force control device as defined in claim 1, wherein said microprocessor is further programmed to set said target engine torque equal to a value obtained by dividing a difference of said target combined torque and said target motor torque, by a torque ratio equal to the inverse of the ratio of the rotation speed of said engine and the input rotation speed of said continuously variable transmission.

5. A drive force control device as defmed in claim 1, wherein said microprocessor is further programmed to set said target combined torque equal to a value obtained by dividing said target drive torque by said real speed ratio.

6. A drive force control device as defined in claim 1, wherein said microprocessor is further programmed to set said target engine rotation speed to be larger when said target drive torque is larger.

7. A drive force control device as defined in claim 1, wherein said microprocessor is further programmed to set said target motor torque to be larger when said target combined torque is larger.

8. A drive force control device as defined in claim 1, wherein said microprocessor is further programmed to store a map which defines the relation of said target drive torque and said target engine rotation speed so as to be able to realize a predetermined power with minimum fuel consumption, and is further programmed to determine said target engine rotation speed based on said target drive torque and said map.

9. A drive force control device as defined in claim 1, wherein said device further comprises a sensor for detecting a charge amount of said battery, and said microprocessor is further programmed to limit a maximum value of said target motor torque to a smaller value, when said battery charge amount is smaller.

10. A drive force control device as defined in claim 1, wherein said device further comprises a sensor for detecting the charge amount of said battery, and said microprocessor is further programmed to set said target engine rotation speed to be lower for the same target drive torque, when said battery charge amount is larger.

11. A hybrid vehicle drive force control device for controlling, according to a depression of an accelerator pedal, an output torque of an engine, an output torque of a motor which varies according to a supply current from a battery, and a speed ratio of a continuously variable transmission which is connected to said engine and said motor, comprising:
   means for detecting a depression amount of said accelerator pedal,
   means for detecting a vehicle speed,
   means for detecting an input rotation speed of said continuously variable transmission,
   means for detecting an output rotation speed of said continuously variable transmission,
   means for setting a target drive torque of said vehicle based on said depression amount of said accelerator pedal and said vehicle speed
   means for setting a target engine rotation speed based on said target drive torque, means for setting a target speed ratio based on said target engine rotation speed and said vehicle speed, means for calculating a real speed ratio of said continuously variable transmission from the input rotation speed and output rotation speed of said continuously variable transmission, means for setting a target combined torque of said engine and said motor based on said target drive torque and said real speed ratio, means for setting a target motor torque based on said target combined torque and said input rotation speed, and means for setting a target engine torque based on the difference of said target combined torque and said target motor torque, means for varying an output torque of said engine based on said target engine torque, means for varying said output torque of said motor based on said target motor torque, and means for varying a speed ratio of said continuously variable transmission based on said target speed ratio.

12. A hybrid vehicle drive force control method for controlling, according to a depression of an accelerator pedal, an output torque of an engine, an output torque of a motor which varies according to a supply current from a battery, and a speed ratio of a continuously variable transmission which is connected to said engine and said motor, comprising:

detecting a depression amount of said accelerator pedal, detecting a vehicle speed, detecting an input rotation speed of said continuously variable transmission, detecting an output rotation speed of said continuously variable transmission, setting a target drive torque of said vehicle based on said depression amount of said accelerator pedal and said vehicle speed, setting a target engine rotation speed based on said target drive torque, setting a target speed ratio based on said target engine rotation speed and said vehicle speed, calculating a real speed ratio of said continuously variable transmission from the input rotation speed and output rotation speed of said continuously variable transmission, setting a target combined torque of said engine and said motor based on said target drive torque and said real speed ratio, setting a target motor torque based on said target combined torque and said input rotation speed, setting a target engine torque based on the difference of said target combined torque and said target motor torque, varying an output torque of said engine based on said target engine torque, varying said output torque of said motor based on sad target motor torque, and varying a speed ratio of said continuously variable transmission based on said target speed ratio.

* * * * *